US009433316B2

(12) United States Patent
Picozza et al.

(10) Patent No.: US 9,433,316 B2
(45) Date of Patent: Sep. 6, 2016

(54) HOT BEVERAGE BREWER FOR MULTIPLE VOLUMES

(71) Applicant: Sunbeam Products, Inc., Boca Raton, FL (US)

(72) Inventors: Augusto A. Picozza, Boca Raton, FL (US); Aaron Abroff, Acton, MA (US); Gary McGonagle, Lynn, MA (US); Dov Glucksman, Danvers, MA (US); Laura Nickerson, Fitchburg, MA (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 14/687,484

(22) Filed: Apr. 15, 2015

(65) Prior Publication Data

US 2015/0289709 A1 Oct. 15, 2015

Related U.S. Application Data

(60) Provisional application No. 61/979,602, filed on Apr. 15, 2014.

(51) Int. Cl.
*A47J 31/44* (2006.01)
*A47J 31/40* (2006.01)
*A47J 31/46* (2006.01)

(52) U.S. Cl.
CPC ........... *A47J 31/4482* (2013.01); *A47J 31/407* (2013.01); *A47J 31/446* (2013.01); *A47J 31/4492* (2013.01); *A47J 31/46* (2013.01)

(58) Field of Classification Search
CPC ...... A47J 31/46; A47J 31/407; A47J 31/446; A47J 31/4482; A47J 31/4492
See application file for complete search history.

(56) References Cited

U.S. PATENT DOCUMENTS

| 5,724,883 | A | * | 3/1998 | Usherovich | A47J 31/057 |
| | | | | | 426/433 |
| 6,003,435 | A | | 12/1999 | Patel | |
| 6,571,686 | B1 | * | 6/2003 | Riley | A47J 31/0605 |
| | | | | | 99/299 |
| 7,089,849 | B2 | | 8/2006 | Chen et al. | |
| 8,037,811 | B2 | | 10/2011 | Bunn | |
| 8,327,753 | B2 | | 12/2012 | White et al. | |
| 8,616,116 | B2 | | 12/2013 | McLaughlin | |
| 8,635,946 | B2 | | 1/2014 | White et al. | |
| 8,850,958 | B2 | | 10/2014 | McCormick et al. | |
| 8,904,923 | B2 | | 12/2014 | McCormick et al. | |
| 8,911,811 | B2 | | 12/2014 | McCormick et al. | |
| 2006/0137533 | A1 | * | 6/2006 | Wise | A47J 31/0576 |
| | | | | | 99/279 |
| 2007/0119308 | A1 | | 5/2007 | Glucksman et al. | |
| 2010/0011964 | A1 | * | 1/2010 | White | A47J 31/0621 |
| | | | | | 99/279 |
| 2011/0100228 | A1 | | 5/2011 | Rivera | |
| 2011/0117248 | A1 | | 5/2011 | Rivera | |

(Continued)

*Primary Examiner* — Anthony Weier
(74) *Attorney, Agent, or Firm* — Tamica C. Crearer

(57) ABSTRACT

Systems (100) and methods (2800) for operating a hot beverage brewer. The methods include receiving a brew basket of a plurality of interchangeable brew baskets (900, 1400, 1800) within a basket chamber (402) of the hot beverage brewer. At least two of the plurality of interchangeable brew baskets are of different brew basket types and designed to hold different amounts of a beverage substance. Thereafter, the hot beverage brewer: automatically detects the brew basket type associated with the brew basket residing within the basket chamber; selects first operations from a plurality of operations that should be performed by the hot beverage brewer based on the brew basket type which was previously detected; and performs the first operations by the hot beverage brewer.

12 Claims, 22 Drawing Sheets

(56) References Cited

U.S. PATENT DOCUMENTS

| | | | |
|---|---|---|---|
| 2013/0164422 A1* | 6/2013 | McCormick | A47J 31/545 426/433 |
| 2013/0337132 A1 | 12/2013 | Fenna et al. | |
| 2014/0013958 A1 | 1/2014 | Krasne et al. | |
| 2014/0102306 A1 | 4/2014 | White et al. | |
| 2014/0290493 A1 | 10/2014 | Rivera | |
| 2015/0053089 A1 | 2/2015 | McCormick et al. | |
| 2015/0157168 A1* | 6/2015 | Burrows | A47J 31/0576 426/231 |
| 2015/0257585 A1* | 9/2015 | Windler | A47J 31/3638 248/311.2 |
| 2015/0257586 A1* | 9/2015 | DiNucci | A47J 31/4492 426/232 |

* cited by examiner

HOT BEVERAGE BREWER FOR MULTIPLE VOLUMES

CROSS-REFERENCE TO RELATED APPLICATIONS

This application claims benefit from U.S. patent application Ser. No. 61/979,602 which was filed on Apr. 15, 2014, and that is incorporated in its entirety herein.

FIELD OF THE INVENTION

This document relates generally to home appliances. More particularly, this document relates to hot beverage brewers that can selectively brew a variable volume of coffee.

BACKGROUND OF THE INVENTION

Hot beverage brewers are well known in art for use in brewing coffee, tea, etc. There are many different types of hot beverage brewers employing various brewing techniques and principles. In some scenarios, water is poured into a separate chamber and coffer grounds are disposed in a paper filter which is located above a coffee pot. Thereafter, the water is heated and directed into a funnel from which it drips through the coffee grounds and into the coffee pot, thereby making coffee.

SUMMARY OF THE INVENTION

The present disclosure concerns implementing systems and methods for operating a hot beverage brewer. The methods involve receiving a brew basket of a plurality of interchangeable brew baskets within a basket chamber of the hot beverage brewer. At least two of the plurality of interchangeable brew baskets are of different brew basket types and designed to hold different amounts of a beverage substance. Thereafter, the hot beverage brewer: automatically detects the brew basket type associated with the brew basket residing within the basket chamber; selects first operations from a plurality of operations that should be performed by the hot beverage brewer based on the brew basket type which was previously detected; and performs the first operations.

In some scenarios, the different brew basket types comprise a large brew basket type for use with carafes and a small basket type for use with single serve containers. Each of the interchangeable brew baskets comprises at least one peg coupled thereto for triggering performance of respective operations of the plurality of operations by the hot beverage brewer. The automatic detection of the brew basket type is facilitated by engagement of a portion of the brew basket with a triggering mechanism of the hot beverage brewer. The triggering mechanism comprises a mechanical triggering mechanism, an optical triggering mechanism, an electrical triggering mechanism, or a magnetic triggering mechanism. Thus, the engagement may cause a depression of a button, an actuation of a switch, or creation of closed electrical circuit.

The first operations comprise at least one of the following operations: discontinuing a display of a visual indicator; selecting at least two visual indicators or virtual buttons from a plurality of visual indicators or virtual buttons; optionally enabling functionality of selected virtual buttons; facilitating a display of selected visual indicators or virtual buttons on a display; setting a brew temperature; and setting a flow rate. The plurality of visual indicators or virtual buttons allow a user of the hot beverage brewer to specify a particular value for a volume parameter that is appropriate for the type of container in which the brewed hot beverage is to be disposed.

The present disclosure also concerns an apparatus. The apparatus comprises a hot beverage brewer with a basket chamber having a first aperture to direct a fluid to a carafe and a second aperture to direct the fluid to a single serve container. The first and second apertures are disposed at respective locations spatially offset from each other. A plurality of interchangeable brew baskets is provided that are of different brew basket types and designed to hold different amounts of a beverage substance. A first brew basket of the plurality of interchangeable brew baskets comprises a first outlet having a location that aligns with the first aperture when the first brew basket is disposed in said basket chamber. A second brew basket of the plurality of interchangeable brew baskets comprises a second outlet having a location that aligns with the second aperture when the second brew basket is disposed in the basket chamber. A spout is provided for directing a fluid into a single serve container that is pivotably coupled to the hot beverage brewer.

During operations, the hot beverage brewer: automatically detects a brew basket type associated with a brew basket residing within the basket chamber; selects first operations from a plurality of operations based on the brew basket type which was previously detected; and performs the first operations. The automatic detection of the brew basket type is facilitated by engagement of a portion of the brew basket with a triggering mechanism of the hot beverage brewer. The first operations comprise at least one of the following operations: discontinuing a display of a visual indicator; selecting at least two visual indicators or virtual buttons from a plurality of visual indicators or virtual buttons; optionally enabling functionality of selected virtual buttons; facilitating a display of selected visual indicators or virtual buttons on a display; setting a brew temperature; and setting a flow rate. The plurality of visual indicators or virtual buttons allow a user of the hot beverage brewer to specify a particular value for a volume parameter that is appropriate for the type of container in which the brewed hot beverage is to be disposed.

The present disclosure further concerns a multi-mode hot beverage brewer. The multi-mode hot beverage brewer comprises: a main body; a basket chamber; a spout; and a plurality of interchangeable brew baskets. The basket chamber has a first aperture to direct a fluid to a carafe and a second aperture to direct the fluid to a single serve container. The first and second apertures are disposed at respective locations spatially offset from each other. The spout is pivotably coupled to the main body and provided for guiding the fluid from the basket chamber to the single serve container. Each of the interchangeable brew baskets causes respective operations of the multi-mode hot beverage brewer to be triggered based on a type of brew basket disposed within the basket chamber.

DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
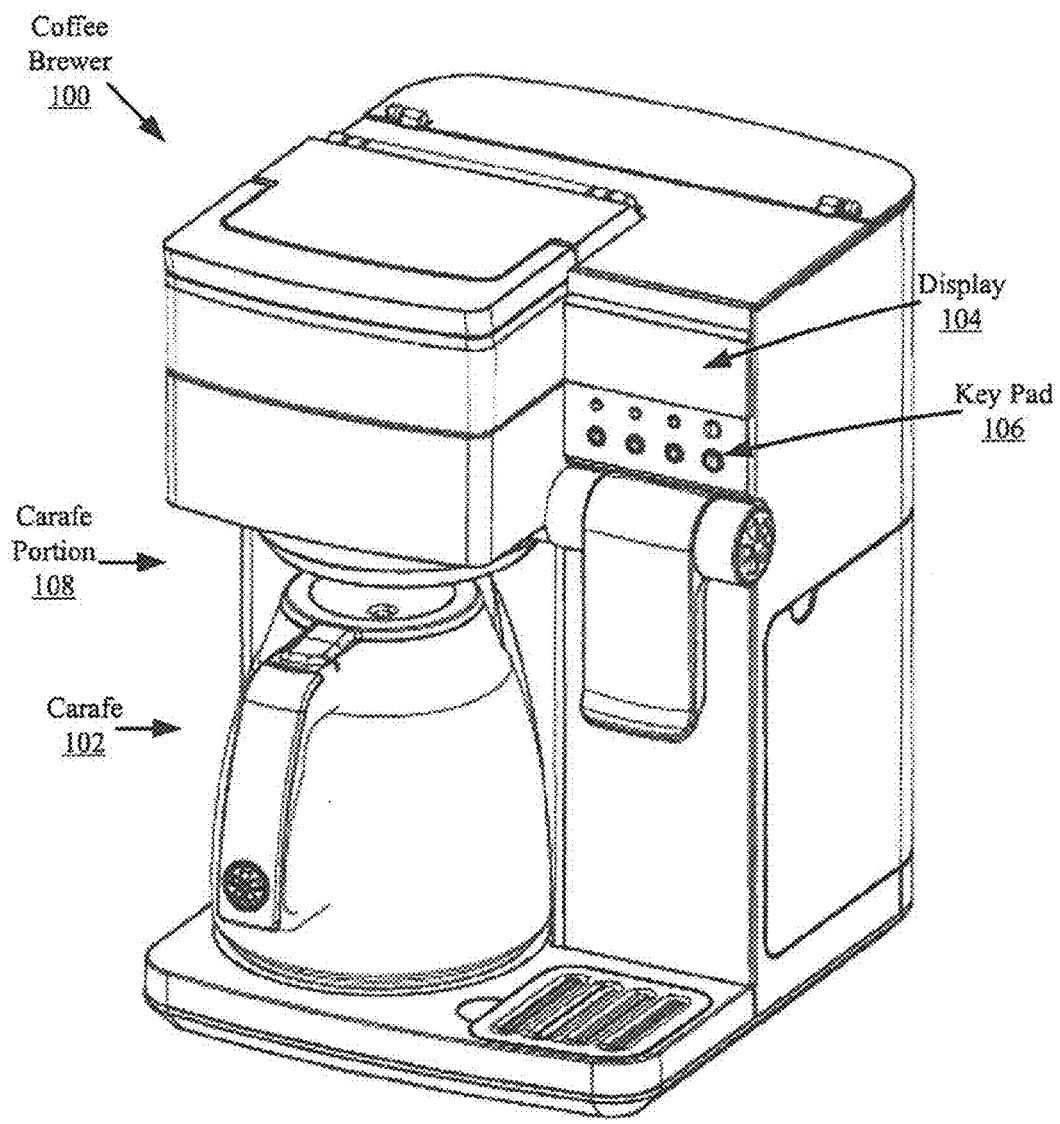
FIGS. 1, 2, and 3 each provide a front perspective view of an exemplary hot beverage brewer.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Figure 29:
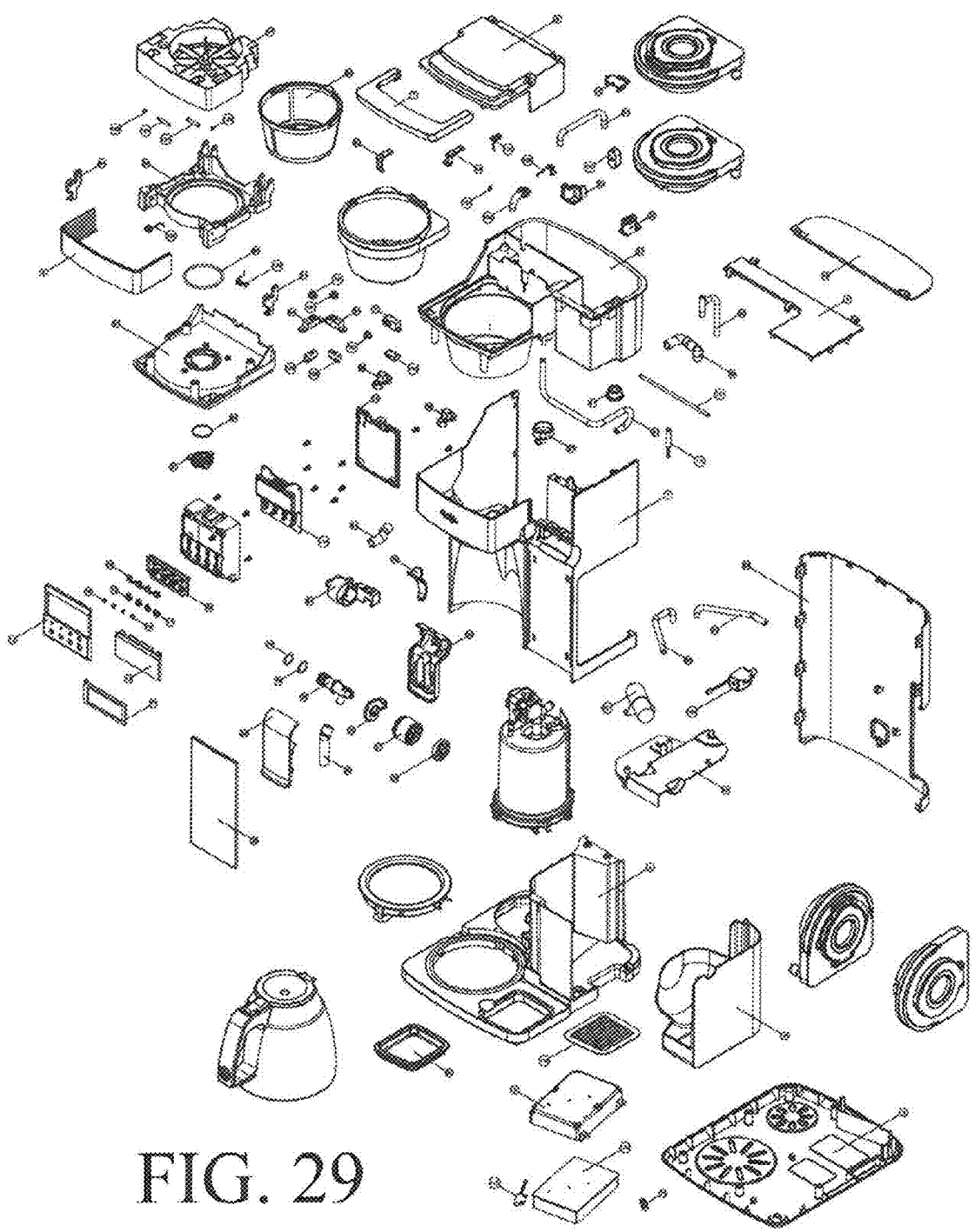
FIG. 29 is a schematic illustration of an exploded assembly view of a hot beverage brewer.

This document concerns home appliances, such as hot beverage brewers (e.g., coffee and/or tea brewers). Schematic illustrations of exemplary architectures for hot beverage brewers are provided in FIGS. 1-5. A schematic illustration of an exploded assembly view the a hot beverage brewer is provided in FIG. 29. Traditionally, consumers have two separate hot beverage brewers, namely a carafe style hot beverage brewer and a single serve style hot beverage brewer. This two appliance requirement is undesirable for many reasons generally understood by those skilled in the art. As such, the present invention addresses this issue by providing a single unit hot beverage brewer capable of brewing a hot beverage into a carafe and/or a single serve container during any given brewing cycle. The hot beverage is brewed at optimal temperature and speed so as to have the best extraction of flavor from crashed beans, seeds, spices or leaves (e.g., coffee grounds or tea leaves) disposed in the hot beverage brewer.

Figure 2:
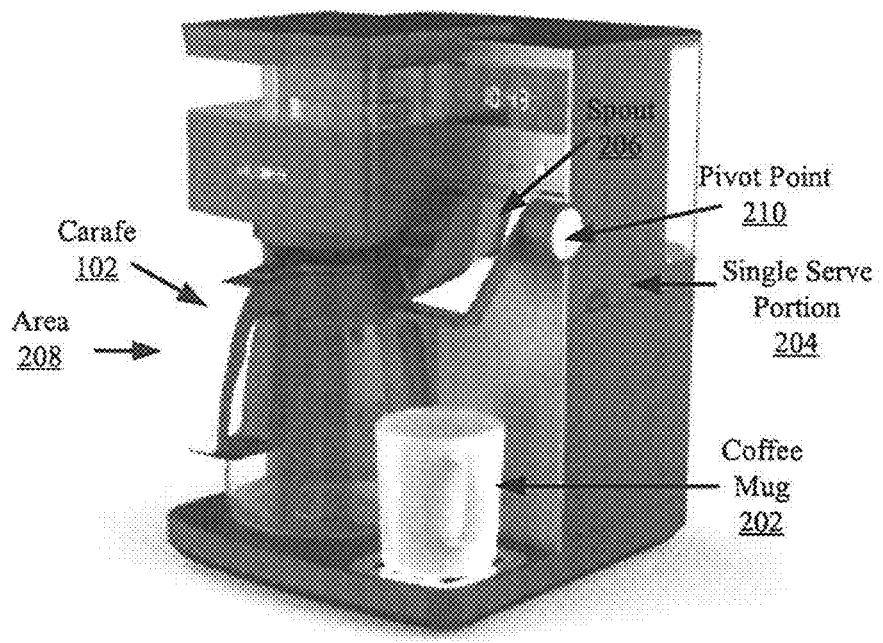
Figure 3:
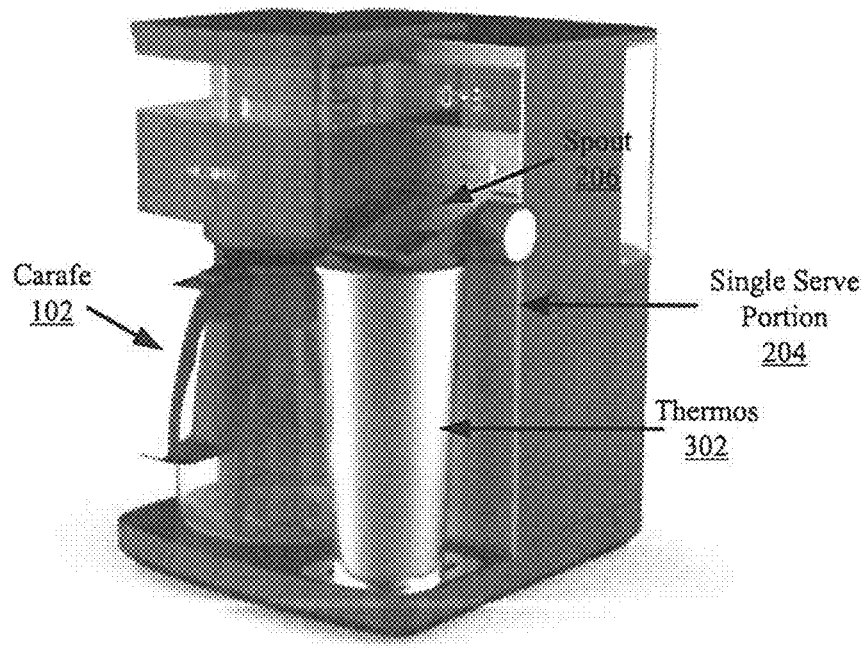
Figure 4:
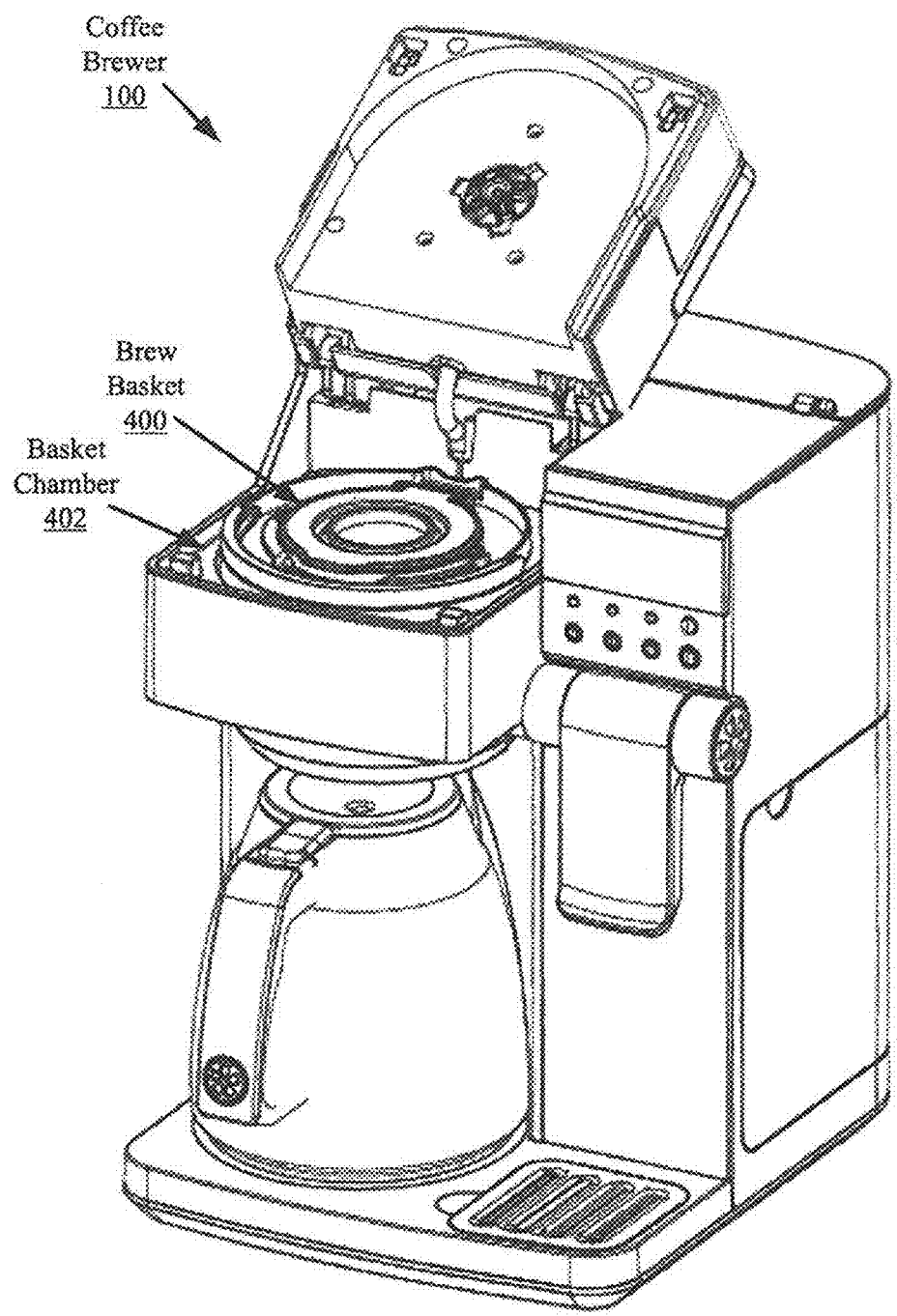
FIGS. 4 and 5 provide schematic illustrations of a basket chamber and a brew basket.
Figure 5:
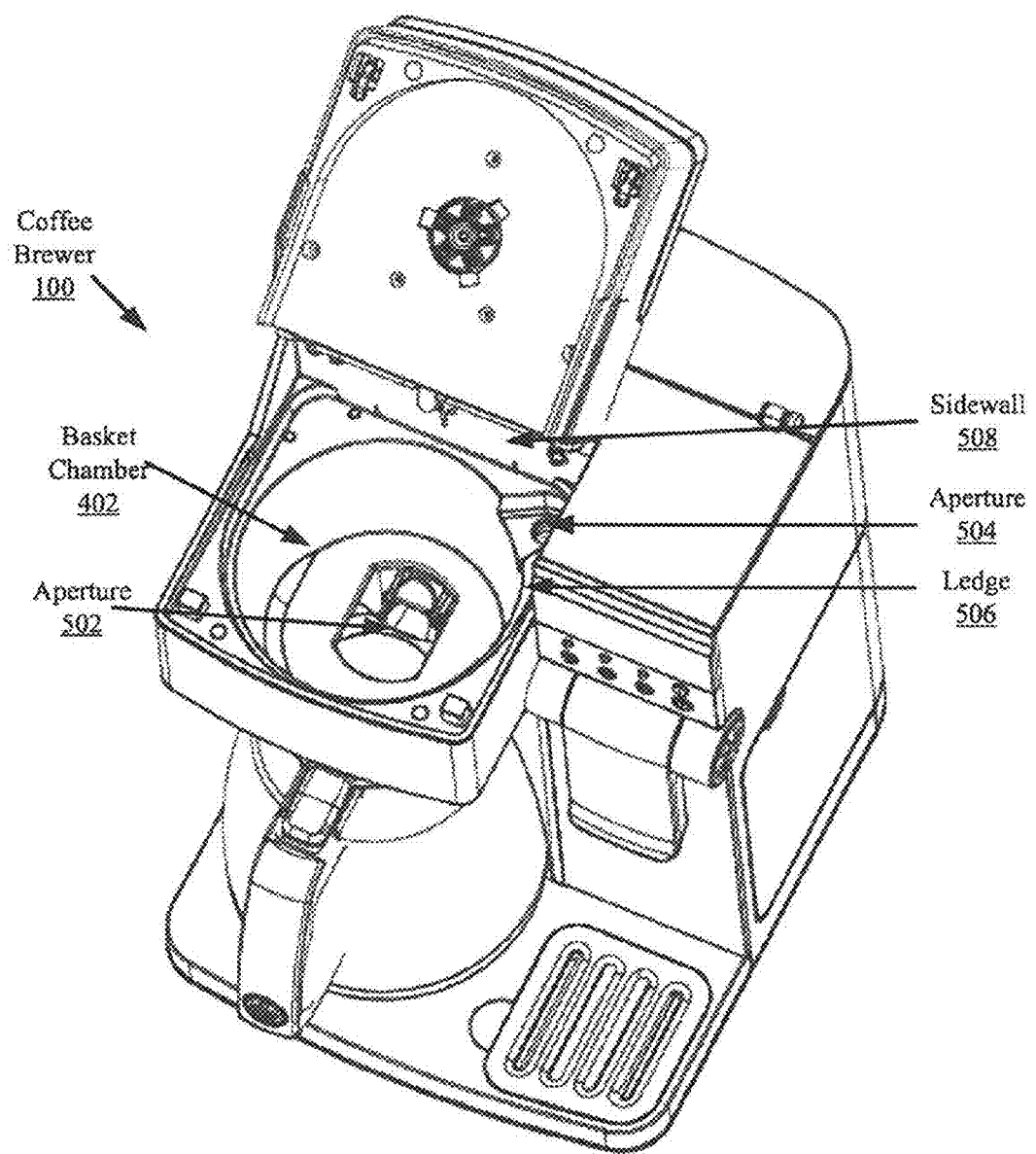

In this regard, the hot beverage brewer 100 is generally configured to selectively brew a variable volume of a hot beverage (e.g., coffee or tea) into a carafe 102 (as shown in FIG. 1) or a variable volume of coffee or tea into a single serve container 202, 302 (as shown in FIG. 2). Carafes and single serve containers are well known in the art, and therefore will not be described herein. Still, it should be understood that the carafes 102 can include, but are not limited to, a glass carafe as shown in FIG. 1 or a thermal carafe (not shown). In some scenarios, the thermal carafe has a mechanism disposed therein for providing notification to the hot beverage brewer that it is to be used to store the brewed beverage during a particular brewing cycle. The mechanism can include, but is not limited to, a magnet. The mechanism can also trigger certain operations of the hot beverage brewer, such as a volume adjustment. The single serve container 202 can include, but is not limited to, a coffee cup or mug 202 as shown in FIG. 2 or a thermos 302 as shown in FIG. 3.

In the carafe scenarios, a carafe portion 108 of the hot beverage brewer 100 is used. The carafe portion 108 uses gravity to brew the hot beverage. For example, hot water is dripped into a brew basket 400 including crushed beans, seeds, spices or leaves (e.g., coffee grounds or tea leaves). The brew basket 400 is located in a basket chamber 402 below a dripper (not shown in FIGS. 1-3) from which the hot water drips. The hot water then travels through the crushed beans/seeds/spices/leaves (e.g., coffee grounds or tea leaves) and into an aperture 502 formed in a bottom surface of the basket chamber 402. After passing through the aperture 502, the hot beverage flows into the carafe 102 located below the brew basket.

In the single serve scenarios, a single serve portion 204 of the hot beverage brewer 100 is used. The single serve portion 204 also uses gravity to brew the hot beverage. However, the hot water is directed to a spout 206 (via an aperture 504 formed in a ledge 506 extending out and away from a sidewall 508 of the basket chamber 402) subsequent to passing through the crushed beans/seeds/spices/leaves (e.g., coffee grounds or tea leaves), instead of to an area 208 in which the carafe 102 can be placed. The spout 206 is provided so that a plurality of different sized single serve containers 202, 302 can be accommodated by the hot beverage brewer 100. In this regard, the position of the spout 206 can be adjusted simply by pivoting the spout about a pivot point 210.

Figure 12:
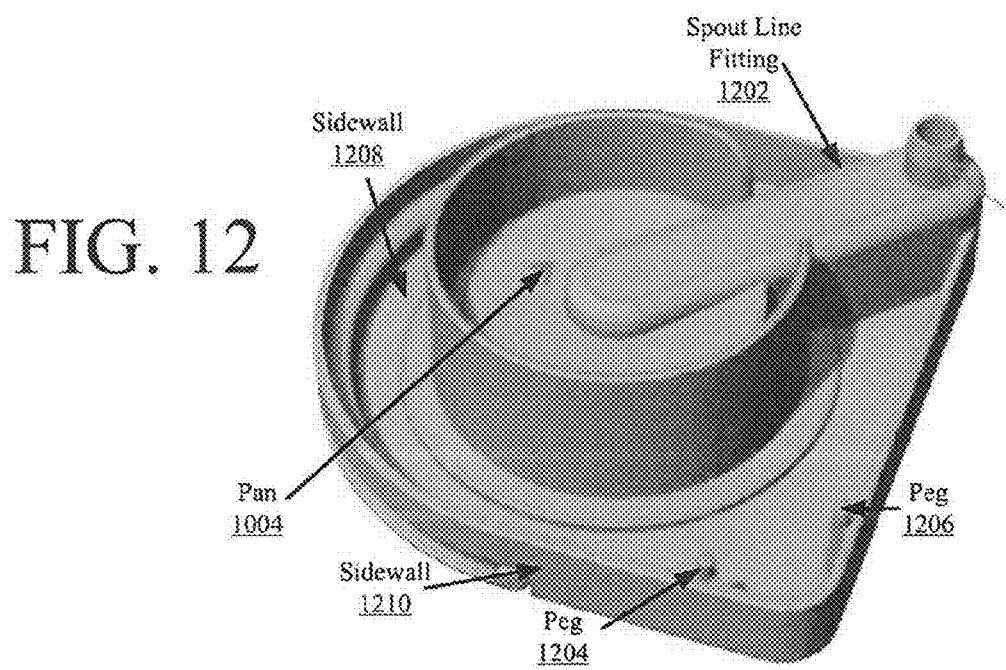
Figure 13:
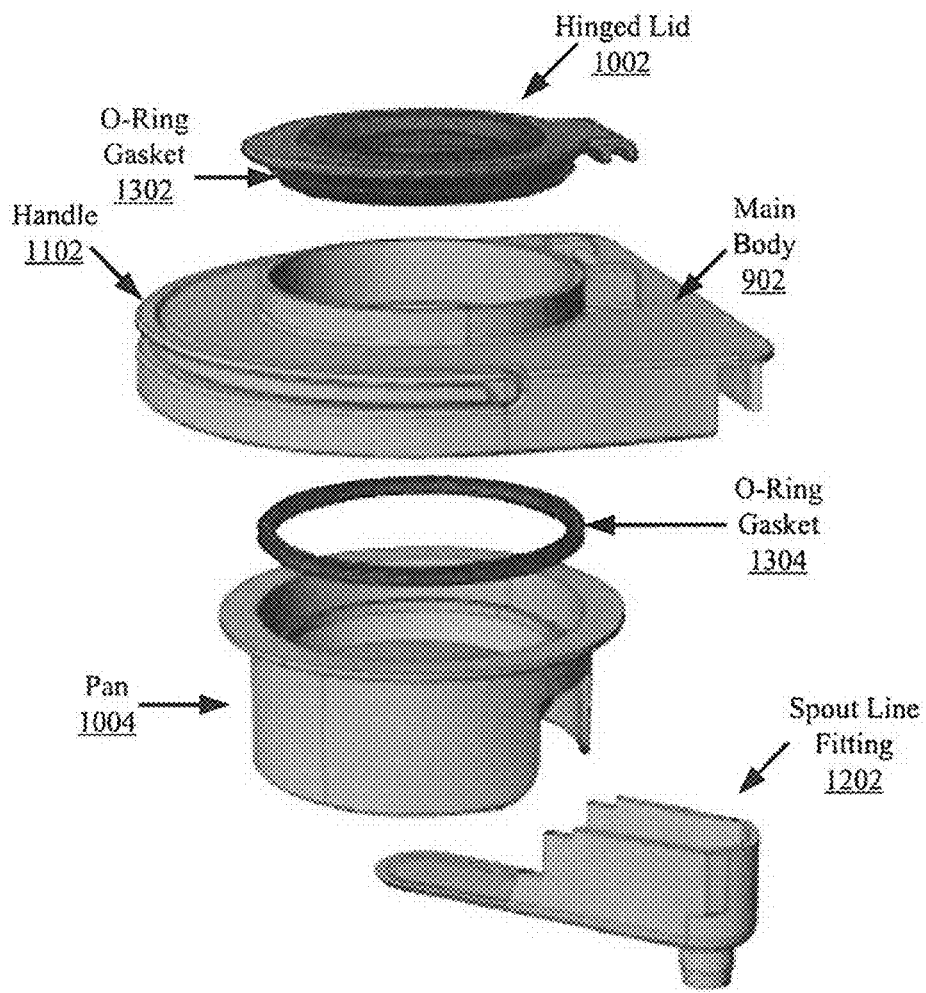
Figure 14:
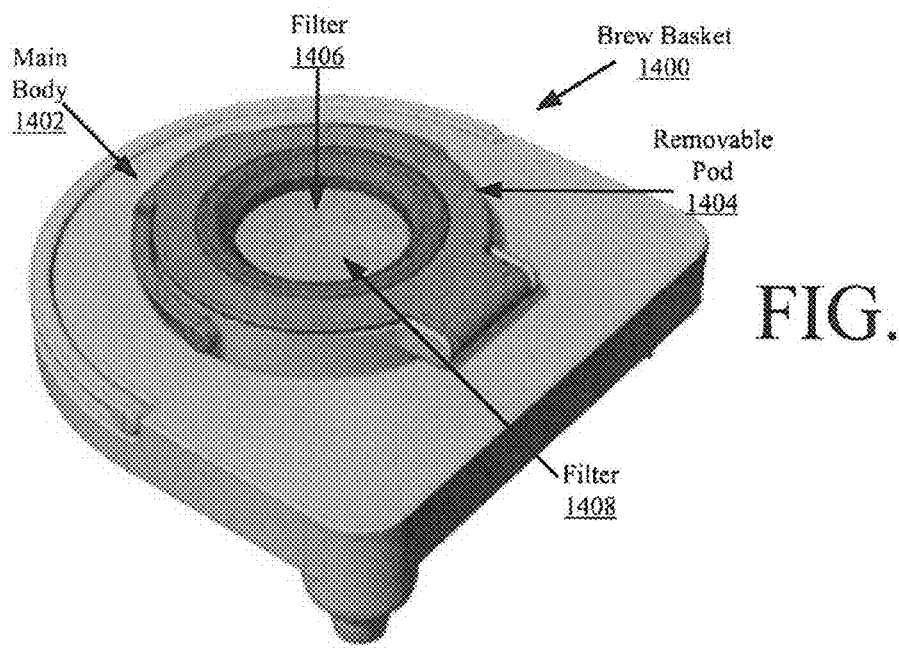
Figure 15:
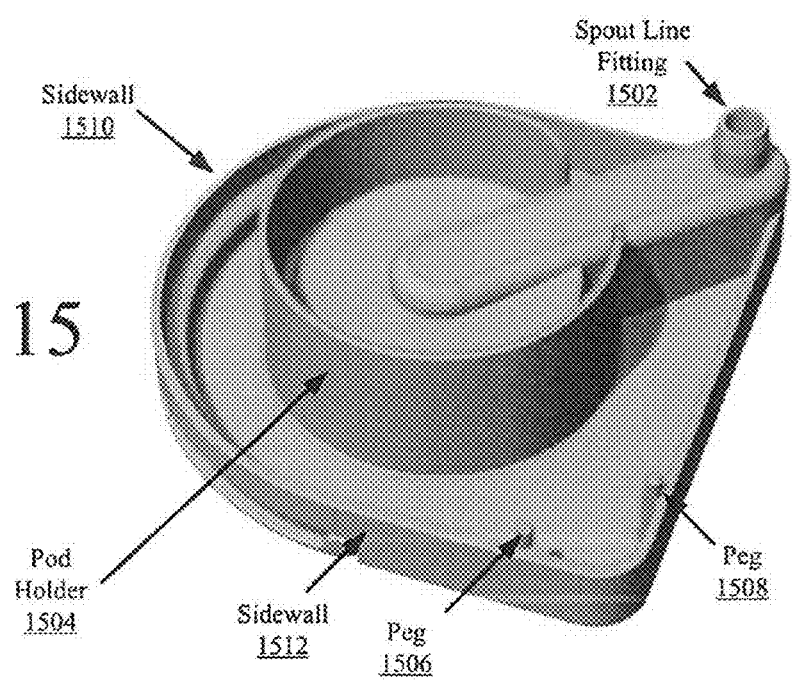
Figure 16:
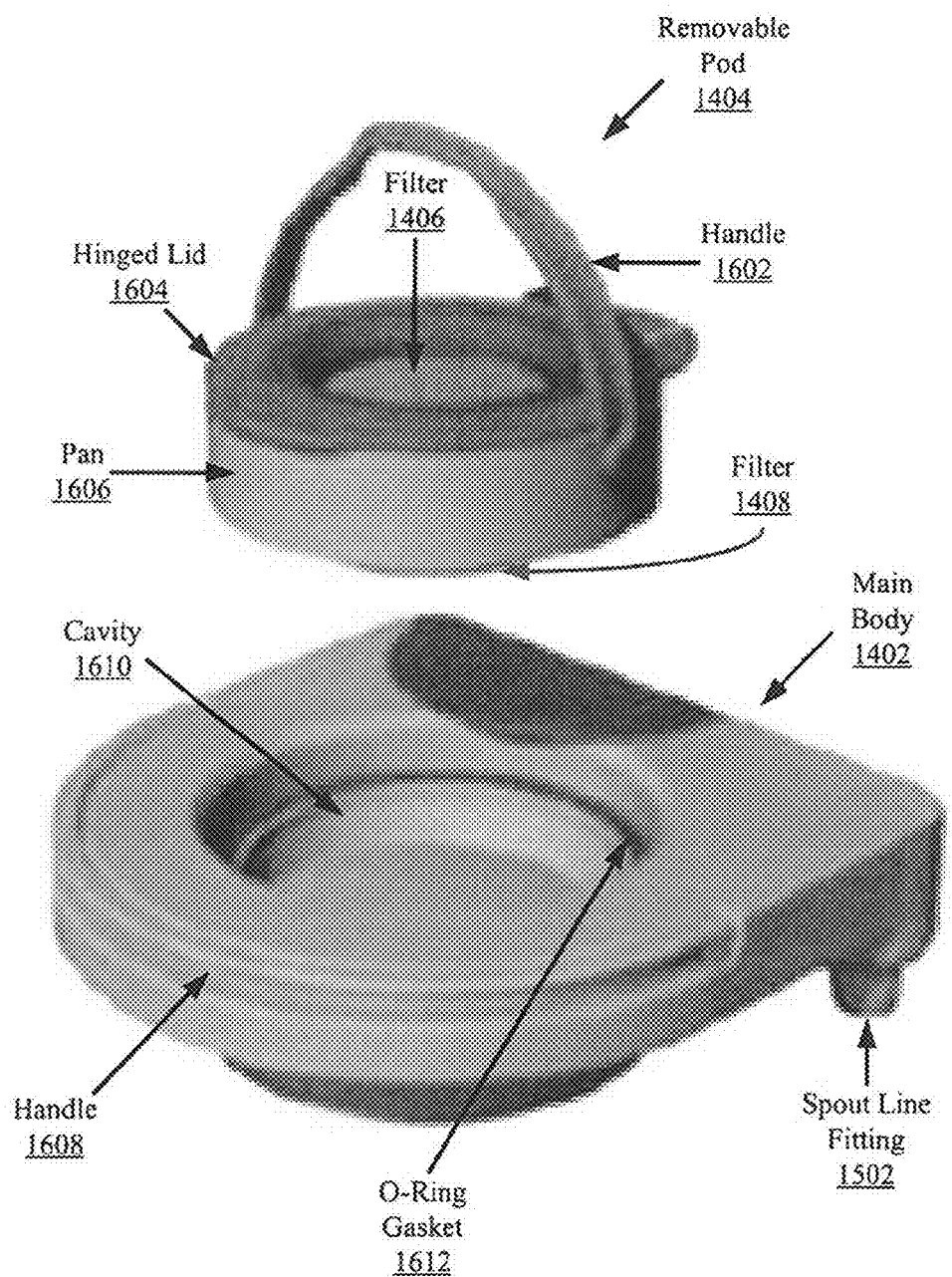
Figure 17:
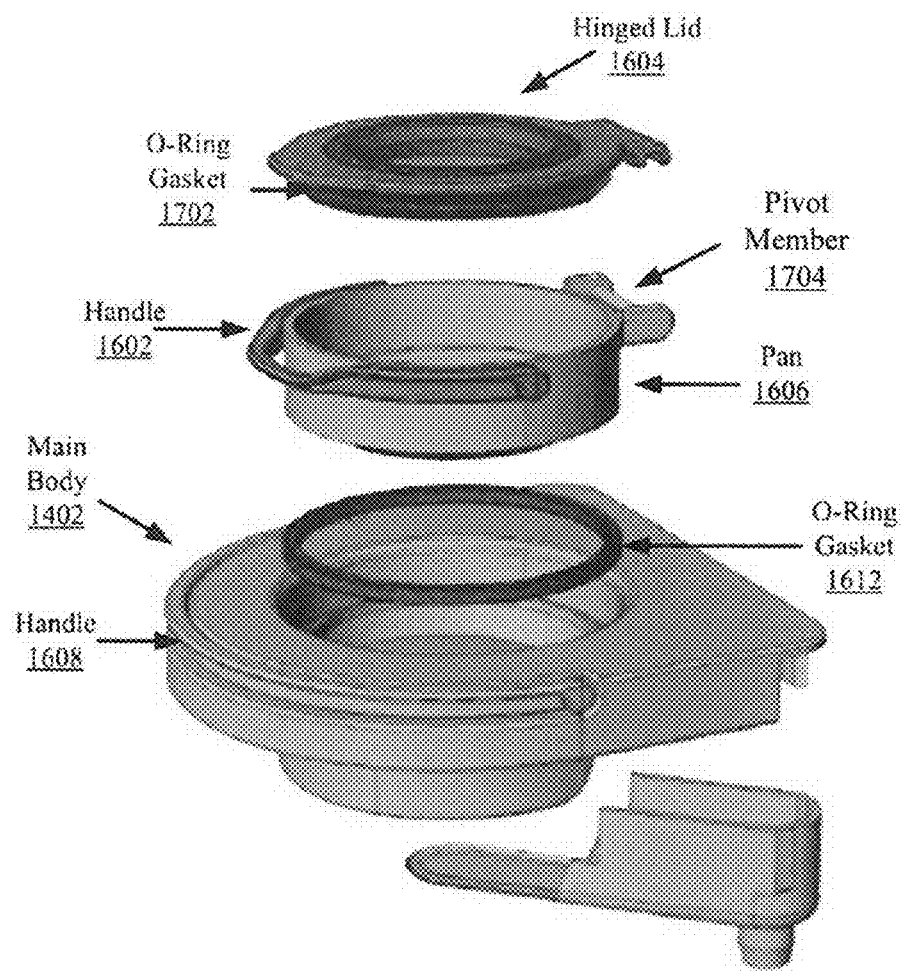
Figures 18, 19:
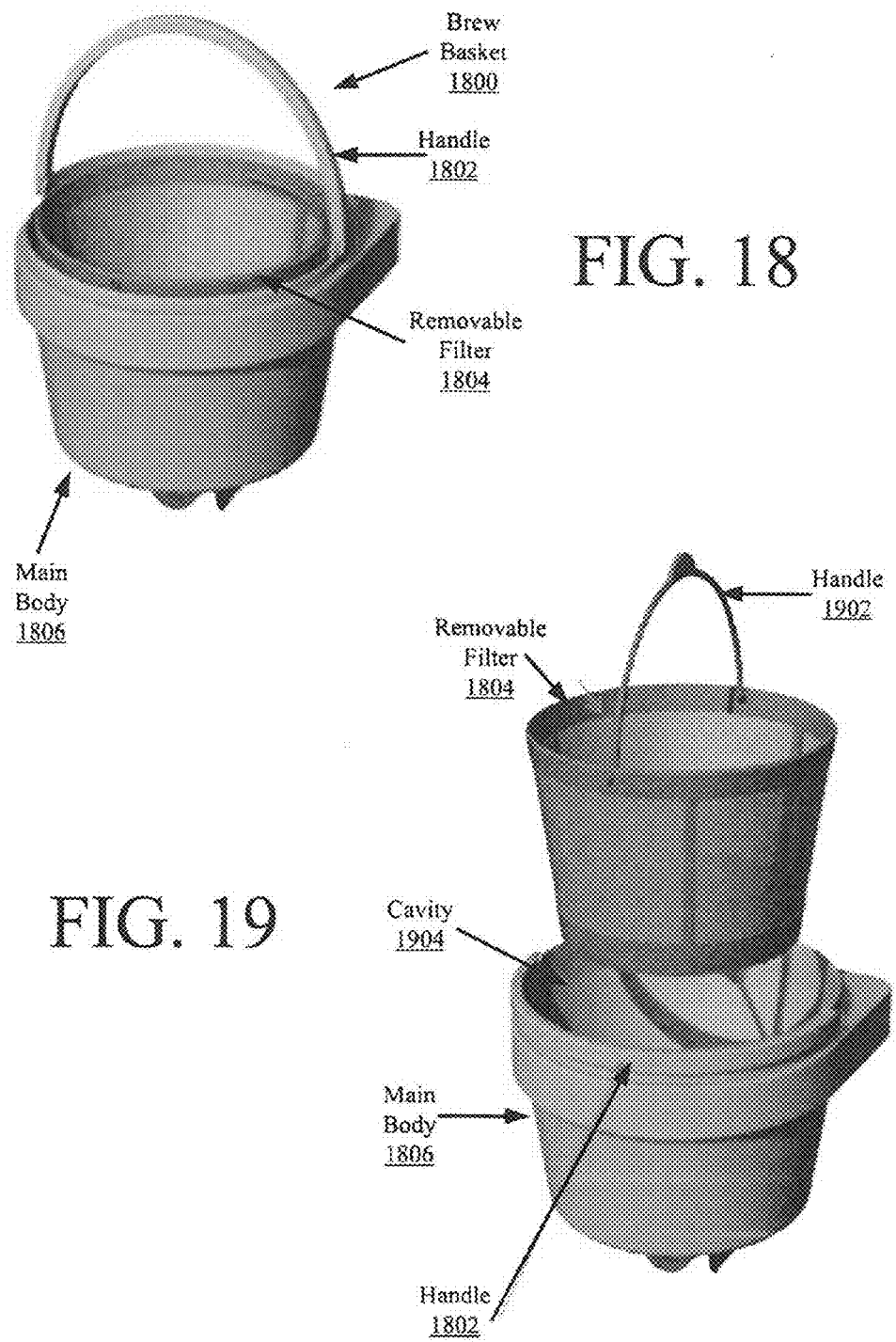
Figure 20:
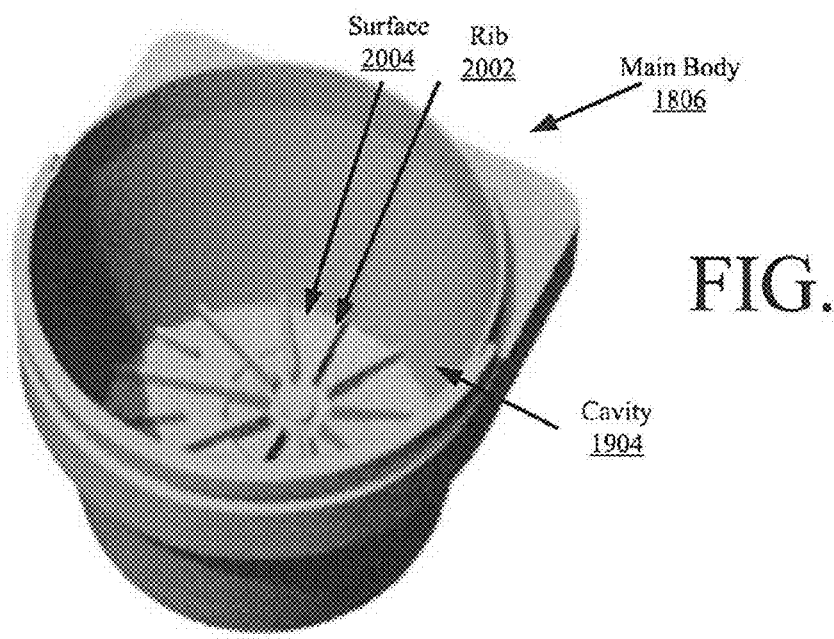
Figure 21:
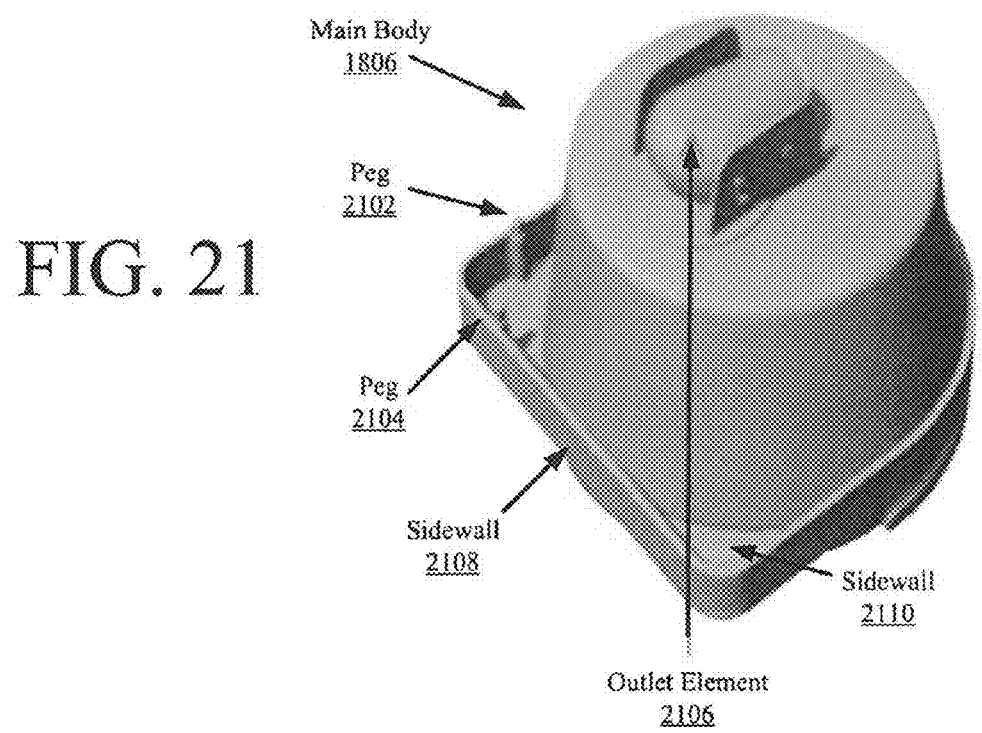

Notably, a brewed hot beverage can be concurrently or simultaneously directed to a carafe and a single serve container. In these scenarios, the hot water is directed through both apertures 502 and 504 during a brewing cycle. As should be appreciated the brew basket employed in this scenario will have two offset outlets to enable such concurrent or simultaneous operations (e.g., outlets 1202 of FIG. 12 and 2106 of FIG. 21).

Figure 6:
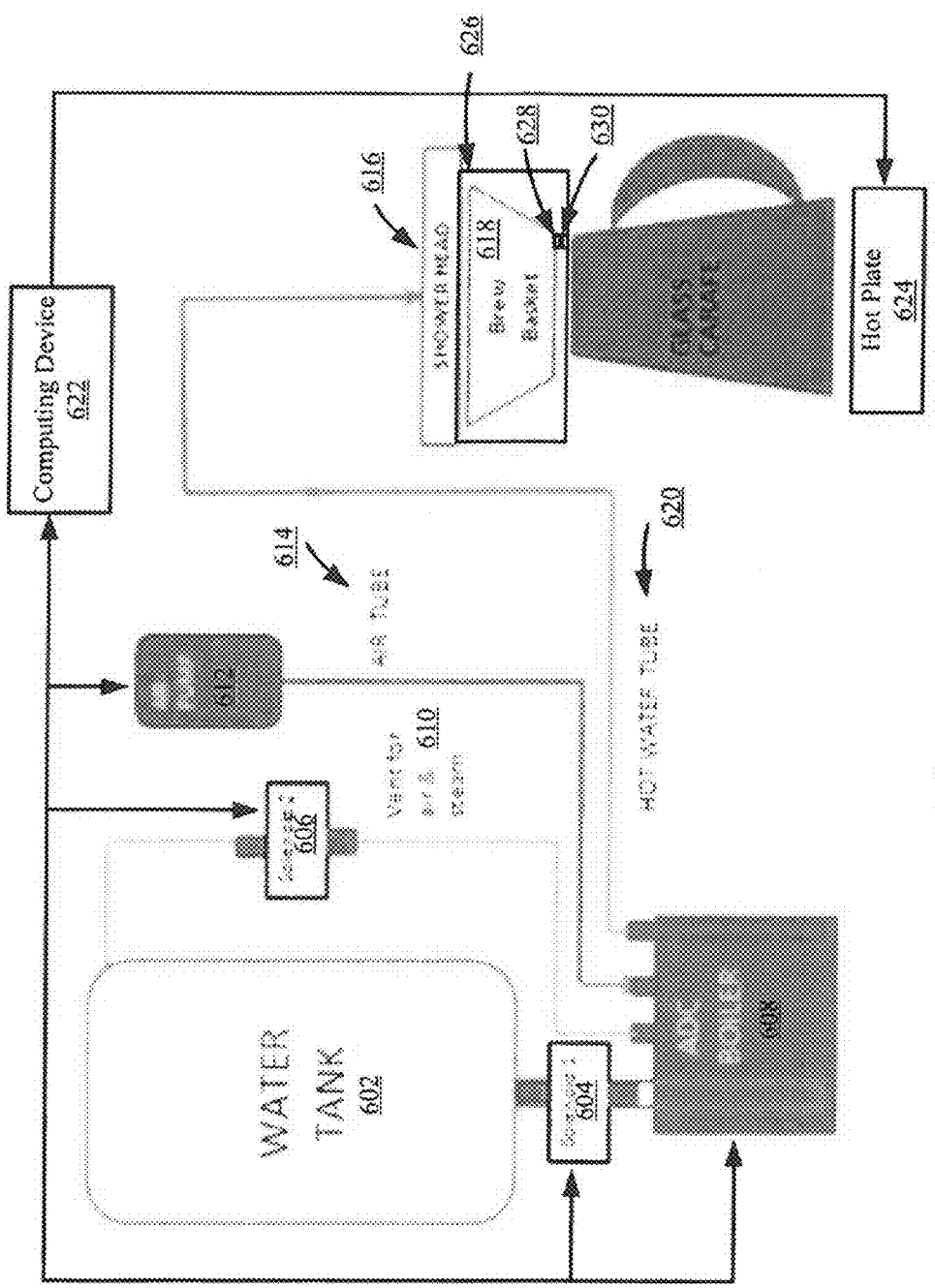
FIG. 6 is a schematic illustration of various internal components of the hot beverage brewer shown in FIG. 1.

Brewing operations of the hot beverage brewer 100 will now be discussed in more detail in relation to FIG. 6. As shown in FIG. 6, the hot beverage brewer 100 comprises a plurality of internal components 602-622. These internal components include, but are not limited to, a water tank 602, solenoid valves 604, 606, a boiler 608, a vent 610, an air pump 612, an air tube 614, a shower head (or dripper) 616, an interchangeable brew basket 618, a hot water tube 620, a computing device 622, a hot plate 624 and a basket chamber 626. Notably, a single heating system is provided for brewing hot beverages into a carafe and/or a single serve container.

Operations of the beverage brewer will be discussed below in relation to a carafe scenario. Still, it should be understood that the operations of the beverage brewer in a single serve scenario are the same or similar to those described below. For example, in some cases, the only change in the following discussion in the single serve scenarios would be which brew basket is employed.

During operation, a carafe (e.g., carafe 102 of FIG. 1) is placed on a hot plate 624 or a single cup container is placed under the pivotable spout (e.g., spout 206 of FIG. 2). Also, a brew basket 618 is selected from a plurality of interchangeable brew baskets. The brew baskets are designed to hold different amounts of crushed beans, seeds, spices or leaves (e.g., coffee grounds or tea leaves). For example, a first one of the brew baskets can hold a relatively large amount of crushed beans/seeds/spices/leaves ("large brew basket"), while a second one of the brew baskets can hold a relatively small amount of crushed beans/seeds/spices/leaves ("small brew basket"). Next, the selected brew basket 618 is disposed in a basket chamber 626 and filled with the crushed beans/seeds/spices/leaves. Water is also poured into the water tank 602, where it will be heated to a certain temperature.

Notably, at least one peg 628 is disposed on or coupled to each of the brew baskets. Each peg 628 provides a means for triggering certain operations of the hot beverage brewer 100 based on the type of brew basket being used. In this regard, the peg 628 may be formed of any suitable material such as plastic or metal. Also, a different number of pegs can be provided on a large brew basket as compared to that provided on the small brew basket. For example, two pegs can be provided with a large brew basket, while only one peg is provided with a small brew basket or vice versa).

In the plastic scenarios, the peg 628 may engage a mechanical triggering mechanism or an optical triggering mechanism. For example, the peg 628 may depress a respective button of a plurality of push buttons or actuate a respective switch 630 of a plurality of switches when the respective brew basket 618 is placed in the basket chamber 626. In the metal scenarios, the peg 628 may engage an electrical triggering mechanism or a magnetic triggering mechanism. For example, the peg 628 may engage two conductive contacts so as to close an electrical circuit.

Such engagement of the peg with the triggering mechanism causes the hot beverage brewer 100 to perform certain operations. For example, the computing device 622 of the hot beverage brewer 100 (1) may discontinue displaying a visual indicator (e.g., an "Add Basket" visual indicator 804 of FIG. 8) on a display (e.g., display 104 of FIG. 1) thereof, (2) select at least two visual indicators from a plurality of visual indicators based on the type of brew basket disposed in the basket chamber 626, (3) facilitate the display of the selected visual indicators on a display (e.g., display 104 of FIG. 1), (4) select at least two virtual buttons from a plurality of virtual buttons based on the type of brew basket disposed in the basket chamber 626, (5) enable the selected virtual buttons, (6) facilitate the display of the selected virtual buttons on a touch-screen display (e.g., display 104 of FIG. 1, (7) set a brew temperature, and/or (8) set a flow rate. The displayed visual indicators and/or virtual buttons allow a user of the hot beverage brewer 100 to specify a particular value for a volume parameter that is appropriate for the type of container in which the brewed hot beverage is to be disposed (e.g., a carafe or a single serve container). In the case that the virtual buttons are not provided, then the user can specify the particular value for the volume parameter as indicated by the visual indicators using a "Brew Size" button 810 of key pad 106.

Figure 8:
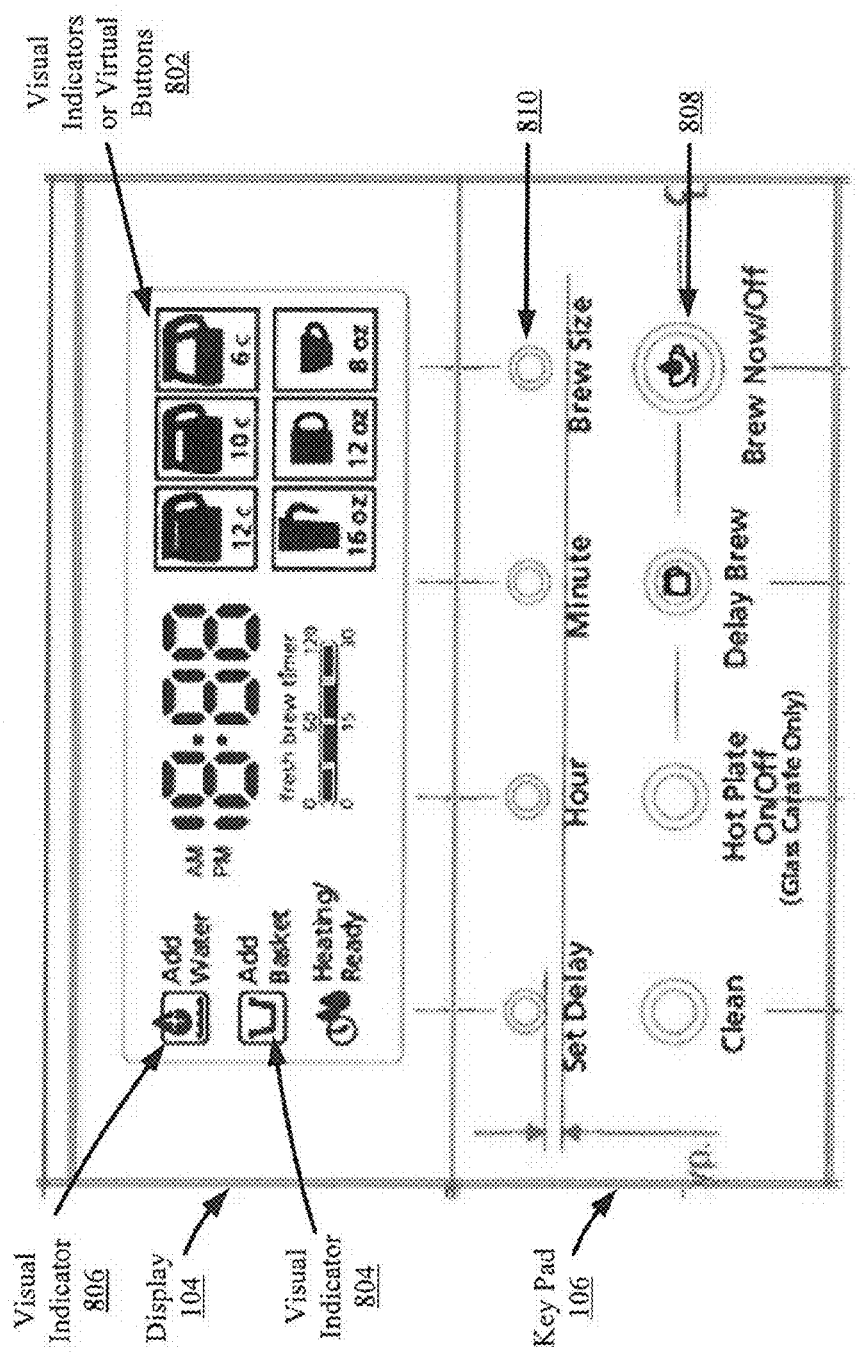
FIG. 8 is a schematic illustration of the display and keypad shown in FIG. 1.
Figure 9:
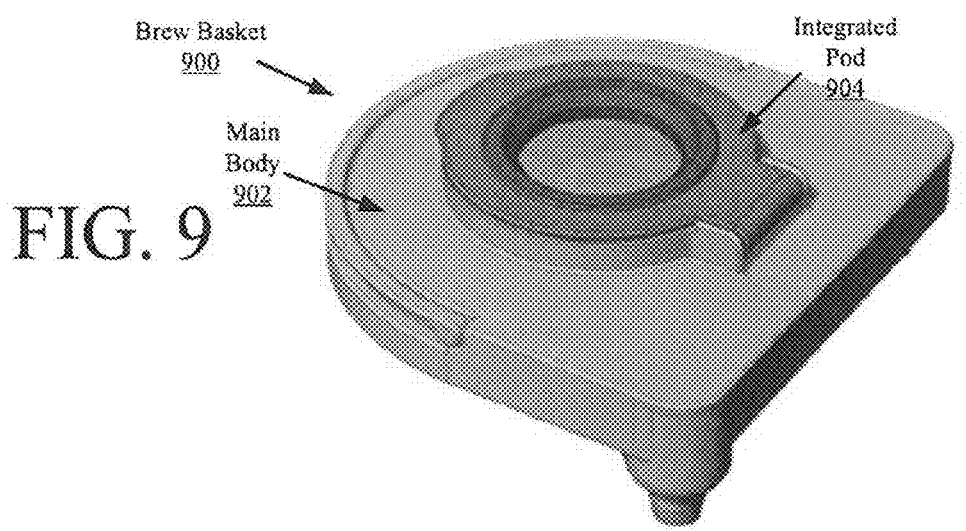
FIGS. 9, 10, 11, 12, 13, 14, 15, 16, 17, 18, 19, 20, and 21 each provide a schematic illustration that is useful for understanding a respective filter basket arrangement of the hot beverage brewer shown in FIG. 1 for carafe scenarios.
Figure 10:
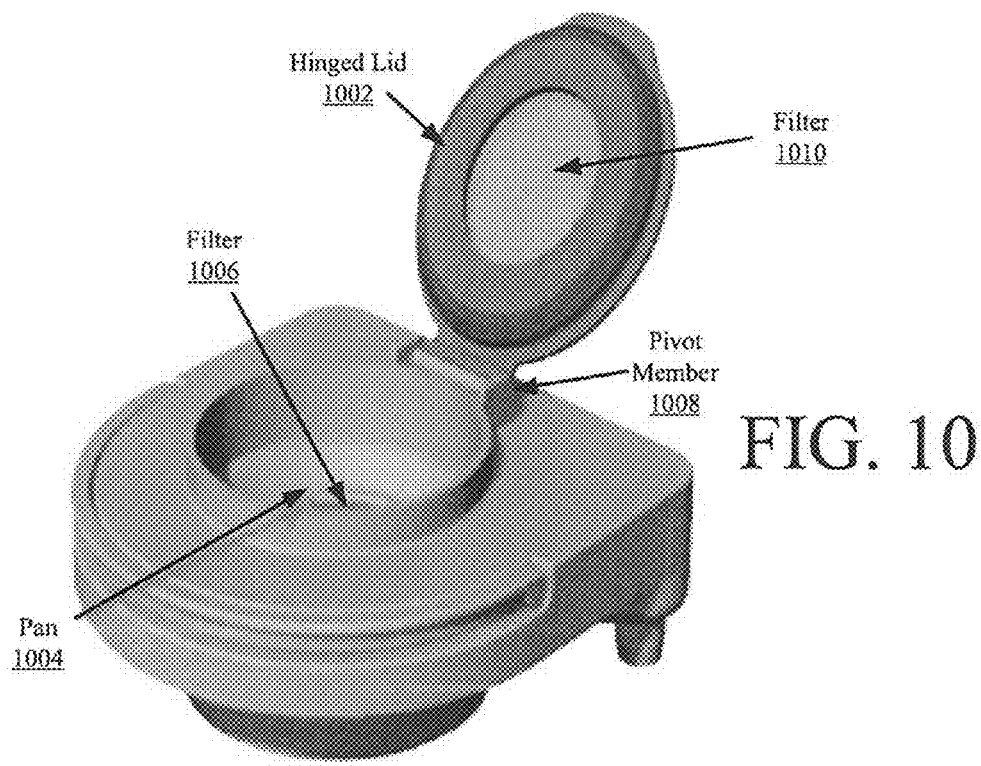
Figure 11:
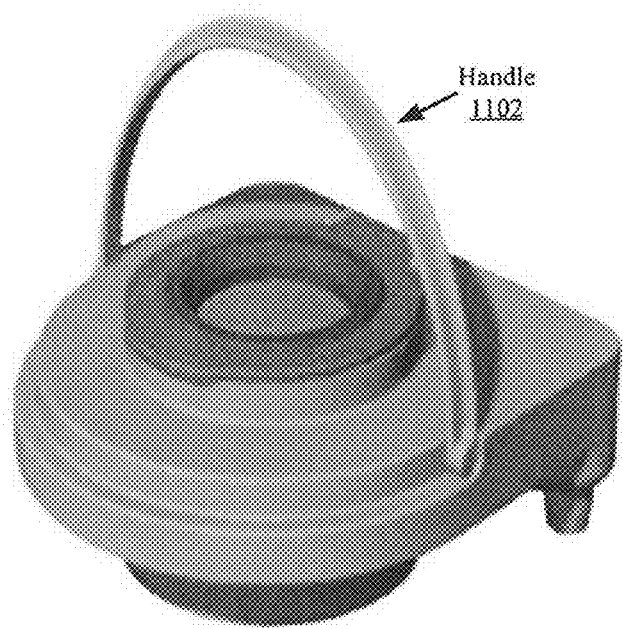

Schematic illustrations of exemplary visual indicators or virtual buttons are provided in FIG. 8. As shown in FIG. 8, the visual indicator 804 is shown if a brew basket is not present in the basket chamber of the beverage brewer. Visual indicator 806 is shown if there is no water in the unit at all or there is not enough water for the selected volume of brewing. Visual indicators or virtual buttons 802 are operative to facilitate a user selection of a 12 cup value, a 10 cup value, a 6 cup value, a 16 ounce value, a 12 ounce value and an 8 ounce value. When a large brew basket is detected within the basket chamber 626 via the peg(s), then the visual indicators or virtual buttons for user-selection of 6 cups, 10 cups and 12 cups are displayed and/or enabled. In contrast, when a small brew basket is detected within the basket chamber 626 via the peg(s), then the visual indicators or virtual buttons for user-selection of 8 ounce, 12 ounce and 16 ounce are displayed and/or enabled. The present invention is not limited to these specific volume and display configurations.

In response to the user-selection of a volume parameter value, the computing device 622 controls internal components 604-612 and 616 for brewing coffee. For example, the computing device 622 performs operations (1) to determine how much water is currently present in the water tank 602, and (2) to determine whether the current amount of water in the water tank is approximately equal to or less than the amount specified by the user selected visual indicator or virtual button 802. If the current amount of water in the water tank is less than the user-selected volume parameter value, then an "Add Water" visual indicator is displayed on the display 104. Also, at this time, a "Brew Now/Off" key 808 is disabled. The "Brew Now/Off" key 808 is re-enabled only when a detection is made that the correct amount of water is in the water tank 602. A visual indicator may be provided adjacent to, around or in proximity to the "Brew Now/Off" key 808 so that the user is informed about the current state of the "Brew Now/Off" key 808. For example, in some scenarios, light is emitted around the "Brew Now/ Off" key 808 when it is enabled or disabled.

In response to the depression of the enabled "Brew Now/Off" key 808, the hot beverage is brewed by: transferring the water from the water tank 602 to the boiler 608 vi air pump 612; heating the water to a particular temperature at the boiler 408; transferring the hot water to the shower head 616 via the hot water tube 620, when a detection is made (e.g., by a temperature sensor—not shown) that the water has been heated to the particular temperature; and dripping the hot water from the shower head 616 into the brew basket 618. Gravity causes the hot water to pass through the brew basket 618 and into the carafe. The brewed beverage in the carafe is kept warm via hot plate 624.

Figure 7:
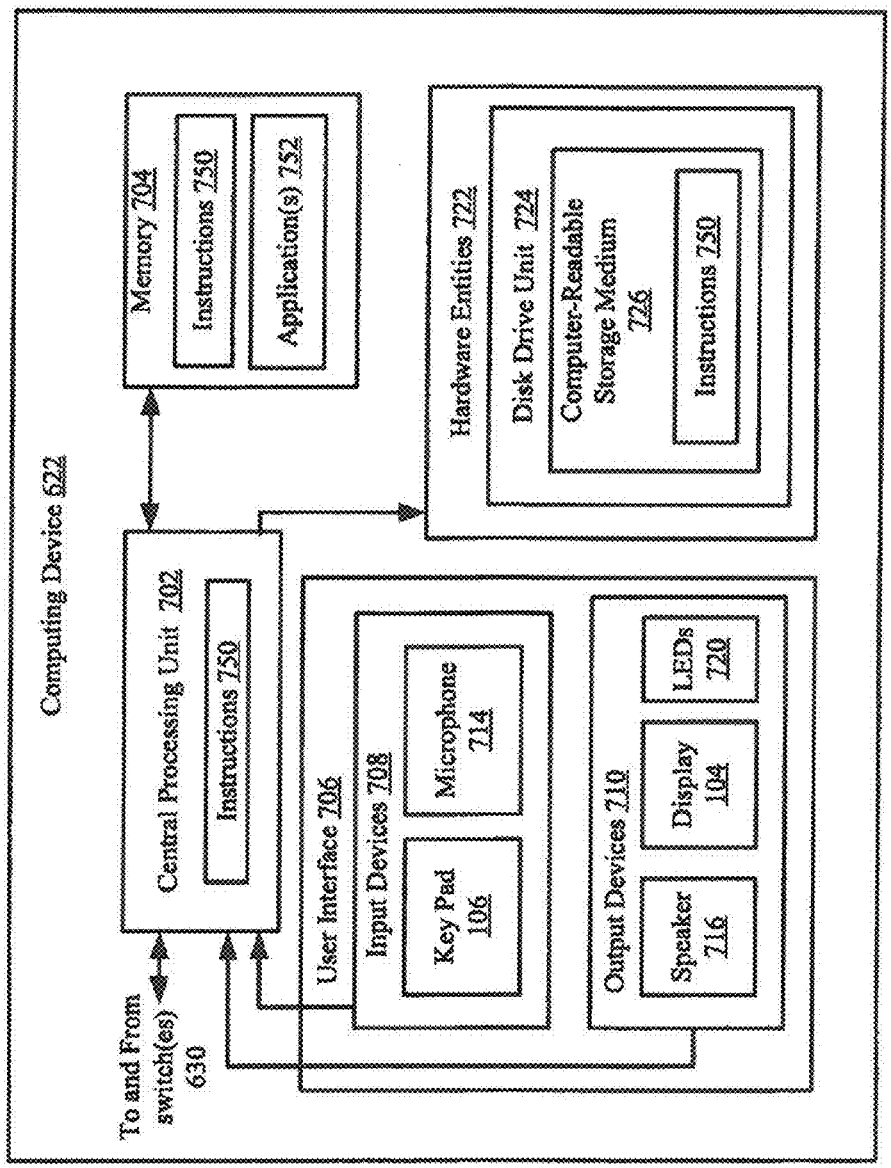
FIG. 7 is a detailed block diagram of the computing device shown in FIG. 6.

A more detailed block diagram of the computing device 622 is provided in FIG. 7. As shown in FIG. 7, the computing device 622 may include more or less components than those shown in FIG. 7. However, the components shown are sufficient to disclose an illustrative embodiment implementing the present invention. Some or all of the components of the computing device 622 can be implemented in hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 7, the computing device 622 comprises a user interface 706, a Central Processing Unit ("CPU") 702, a memory 704, and hardware entities 722. The user interface can include input devices 708 (e.g., a keypad 106 and/or a microphone 714) and output devices 710 (e.g., speaker 716, a display 104, and/or LEDs 720), which facilitate user-software interactions for controlling operations of the hot beverage brewer 100.

At least some of the hardware entities 722 perform actions involving access to and use of memory 704, which can be a Random Access Memory ("RAM"), a disk driver and/or a Compact Disc Read Only Memory ("CD-ROM"). Hardware entities 722 can include a disk drive unit 724 comprising a computer-readable storage medium 726 on which is stored one or more sets of instructions 750 (e.g., software code) configured to implement one or more of the methodologies, procedures, or functions described herein. The instructions 750 can also reside, completely or at least partially, within the memory 704 and/or within the CPU 702 during execution thereof by the computing device 622. The memory 704 and the CPU 702 also can constitute machine-readable media. The term "machine-readable media", as used here, refers to a single medium or multiple media (e.g., a centralized or distributed database, and/or associated caches and servers) that store the one or more sets of instructions 750. The term "machine-readable media", as used here, also refers to any medium that is capable of storing, encoding or carrying a set of instructions 750 for execution by the computing device 622 and that cause the computing device 622 to perform any one or more of the methodologies of the present disclosure.

In some embodiments of the present invention, the hardware entities 722 include an electronic circuit (e.g., a processor) programmed for facilitating the control of a hot beverage brewer. In this regard, it should be understood that the electronic circuit can access and run at least one software application 752 installed on the computing device 622. The software application 752 is generally operative to facilitate brewing coffee. In this regard, the software application 752 implements some or all of the coffee brewing processes described herein.

Exemplary architectures for the interchangeable brew baskets will now be described in detail in relation to FIGS. 9-21. More specifically, a first exemplary architecture for a small brew basket is shown in FIGS. 9-13, a second exemplary architecture for a small brew basket is shown in FIGS. 14-17 and a third exemplary architecture for a large brew basket is shown in FIGS. 18-21. Notably, the small brew baskets of FIGS. 9-13 and 14-17 are configured to hold a smaller amount of crushed beans/seeds/spices/leaves (e.g., coffee grounds or tea leaves) than the large brew basket of FIGS. 18-21.

Also, the large and small brew baskets can have the same or different number of pegs coupled thereto. The pegs may have any shape and/or size selected in accordance with a particular application. If the large and small brew baskets have the same number of pegs, then the pegs will be placed at different relative locations thereon. For example, two pegs of the large brew basket reside in proximity to a front right corner thereof, while two pegs of the small brew basket reside in proximity to a front left corner thereof. Alternatively, both sets of pegs reside in proximity to the same corner of the large and small brew baskets but have different spacing between the two pegs.

As noted above, the pegs provide a means for triggering certain operations of the hot beverage brewer based on the type of brew basket being used. These operations can include, but are not limited to, (1) setting a brew temperature, (2) setting a flow rate, (3) discontinuing the display of certain icons, identifiers or other information on a display, and/or (4) enabling/displaying select visual indicators or virtual buttons. The pegs may be fixedly or removably secured to the brew baskets. The removable pegs allow the user to customize which operations (1)-(4) are to be triggered thereby. For example, a first person prefers coffee at a first temperature and a second person prefers coffee at a second different temperature. A peg can be placed at a first location on the brew basket to indicate the user-selection of the first temperature or at a second location on the brew basket to indicate the user-selection of the second temperature. The same technique can be used to select a flow rate. The present invention is not limited to the particulars of this example.

Referring now to FIGS. 9-13, the small brew basket 900 comprises a main body 902 and an integrated pod 904. A handle 1102 is coupled to the main body 902 to facilitate the brew baskets insertion into and removal from the basket chamber 402 of the hot beverage brewer 100. All of these components 902, 904, 1102 can be formed of any suitable material such as plastic.

The integrated pod 904 includes a hinged lid 1002 coupled to a pivot member 1008. The hinged lid 1002 allows access to a pan 1004. The pan 1004 is sized and shaped to receive a certain amount of crushed beans/seeds/spices/ leaves (e.g., coffee grounds or tea leaves).

Two filters 1006, 1010 are provided as well. A first filter 1010 is provided on the hinged lid 1002, while a second filter 1006 is provided in the pan 1004. In effect, hot water passes through filter 1010 upon entry into the pan 1004 and passes through filter 1006 upon exit from the pan 1004. The filters 1006, 1010 may be formed of the same or different filtration materials. The filtration materials include, but are not limited to wire meshes and activated carbon based materials. The wire mesh can be formed of a nylon, polyester or stainless steel. The aperture sizing of the wire mesh can be the same or different for the first filter 1010 and the second filer 1006. In some scenarios, filter 1010 is designed to filter contaminants from the hot water. Accordingly, filter 1010 may include a plurality of filtration layers. For example, filter 1010 may include two mesh layers having an activated carbon layer disposed therebetween. The two mesh layers may have the same or different aperture sizing.

Two pegs 1204, 1206 are coupled to sidewalls 1208, 1210 of the main body 902. The pegs are shown as being fixedly secured to the sidewalls 1208, 1210. However, the present invention is not limited in this regard. The pegs could alternatively be removably secured to the sidewalls 1208, 1210. Also, there may be more or less pegs than that shown in FIGS. 9-13. The peg(s) provide a means for triggering certain operations of the hot beverage brewer based on the type of brew basket being used, as discussed above. These operations can include, but are not limited to, (1) setting a brew temperature, (2) setting a flow rate, (3) discontinuing the display of certain icons, identifiers or other information on a display, and/or (4) enabling/displaying select visual indicators or virtual buttons.

A spout line fitting 1202 is provided to guide the hot water to aperture 504 of the basket chamber 402. In effect, the hot water is directed towards the spout 206 and into a single serve container during a brew cycle.

Notably, the brew basket 900 is designed such that a certain amount of pressure (e.g., 2 psi) builds inside the integrated pod 904 during a brew cycle. In this regard, water is pumped into the integrated pod 904 through an opening which is larger than the opening out of the integrated pod 904. Also, two O-ring gaskets 1302, 1304 are provided to facilitate such pressurization, as well as prevent water from leaking out of the integrated pod 904 via paths other than the spout line fitting 1202.

Referring now to FIGS. 14-17, the small brew basket 1400 comprises a main body 1402 and a removable pod 1404. A first handle 1608 is coupled to the main body 1402 to facilitate the brew baskets insertion into and removal from the basket chamber 402 of the hot beverage brewer 100. A second handle 1602 is coupled to the removable pod 1494 to facilitate the insertion and removal from a cavity 1610 formed in the main body 1402. This enables relatively easier cleaning of the pod 1404, and/or the ability to use a plurality of interchangeable pods. The interchangeable pods can be designed to hold different amounts of crushed beans/seeds/spices/leaves (e.g., coffee grounds or tea leaves). If the interchangeable pods are not employed, then a plurality of measurement lines can be provided on an inner sidewall surface of the removable pod 1404. All of these components 1402, 1404, 1602, 1608 can be formed of any suitable material such as plastic.

The removable pod 1404 includes a hinged lid 1604 coupled to a pivot member 1704. The hinged lid 1604 allows access to a pan 1606. The pan 1606 is sized and shaped to receive a certain amount of crashed beans/seeds/spices/leaves (e.g., coffee grounds or tea leaves).

Two filters 1406, 1408 are provided as well. A first filter 1406 is provided on the hinged lid 1604, while a second filter 1408 is provided in bottom of the pan 1606. In effect, hot water passes through first filter 1406 upon entry into the pan 1606 and passes through the second filter 1408 upon exit from the pan 1606. The filters 1406, 1408 may be formed of the same or different filtration materials. The filtration materials include, but are not limited to, wire meshes and activated carbon based materials. The wire mesh can be formed of a nylon, polyester or stainless steel. The aperture sizing of the wire mesh can be the same or different for the first filter 1406 and the second filter 1408. In some scenarios, the first filter 1406 is designed to filter contaminants from the hot water. Accordingly, the first filter 1406 may include a plurality of filtration layers. For example, the first filter 1406 may include two mesh layers having an activated carbon layer disposed therebetween. The two mesh layers may have the same or different aperture sizing.

Two pegs 1506, 1508 are coupled to sidewalls 1510, 1512 of the main body 1402. The pegs are shown as being fixedly secured to the sidewalls 1510, 1512. However, the present invention is not limited in this regard. The pegs could alternatively be removably secured to the sidewalk 1510, 1512. Also, there may be more or less pegs than that shown in FIGS. 14-17. The peg(s) provide a means for triggering certain operations of the hot beverage brewer based on the type of brew basket being used, as discussed above. These operations can include, but are not limited to, (1) setting a brew temperature, (2) setting a flow rate, (3) discontinuing the display of certain icons, identifiers or other information on a display, and/or (4) enabling/displaying select visual indicators or virtual buttons.

A spout line fitting 1502 is provided to guide the hot water to aperture 504 of the basket chamber 402. In effect, the hot water is directed towards the spout 206 and into a single serve container a brew cycle.

Notably, the brew basket 1400 is designed such that a certain amount of pressure (e.g., 2 psi) builds inside the removable pod 1404 during a brew cycle. In this regard, water is pumped into the removable pod 1404 through an opening which is larger than the opening out of the removable pod 1404. Also, two O-ring gaskets 1612, 1702 are provided to facilitate such pressurization, as well as prevent water from leaking out of the removable pod 1404 via paths other than the spout line fitting 1502.

Referring now to FIGS. 18-21, the large brew basket 1800 comprises a main body 1806 and a removable filter 1804. A first handle 1802 is coupled to the main body 1806 to facilitate the brew basket's 1800 insertion into and removal from the basket chamber 402 of the hot beverage brewer 100. A second handle 1902 is coupled to the removable filter 1804 to facilitate the insertion into and removal from a cavity 1904 formed in the main body 1806. The removable filter 1804 is sized and shaped to receive a certain amount of crushed beans/seeds/spices/leaves (e.g., coffee grounds or tea leaves). The removable filter 1804 is formed of one or more filtration materials. The filtration materials include, but are not limited to, wire meshes and activated carbon based materials. The wire mesh can be formed of a nylon, polyester or stainless steel.

A plurality of ribs 2002 are formed on an inner bottom surface 2904 of the main body 1806. The ribs 2002 are provided to facilitate fluid flow out of an outlet element 2106. The outlet element 2106 is sized and shaped to fit within aperture 502 of the basket chamber 402. The outlet element 2196 is provided to guide the hot water to aperture 502. In effect, hot water is directed towards a carafe disposed therebelow during a brew cycle. Notably, the outlet element 2106 can include, but is not limited to, a pause-and-serve component to ensure that the hot beverage does not continue to flow therethrough when the carafe is removed from the beverage brewer during a brewing cycle.

Two pegs 2102, 2104 are coupled to sidewalk 2108, 2110 of the main body 1806. The pegs are shown as being fixedly secured to the sidewalls 2108, 2110. However, the present invention is not limited in this regard. The pegs could alternatively be removably secured to the sidewalls 2108, 2110. Also, there may be more or less pegs than that shown in FIGS. 18-21. As discussed above, the pegs provide a means for triggering certain operations of the hot beverage brewer based on the type of brew basket being used. These operations cart include, but are not limited to, (1) setting a brew temperature, (2) setting a flow rate, (3) discontinuing the display of certain icons, identifiers or other information on a display, and/or (4) enabling/displaying select visual indicators or virtual buttons.

Figure 22:
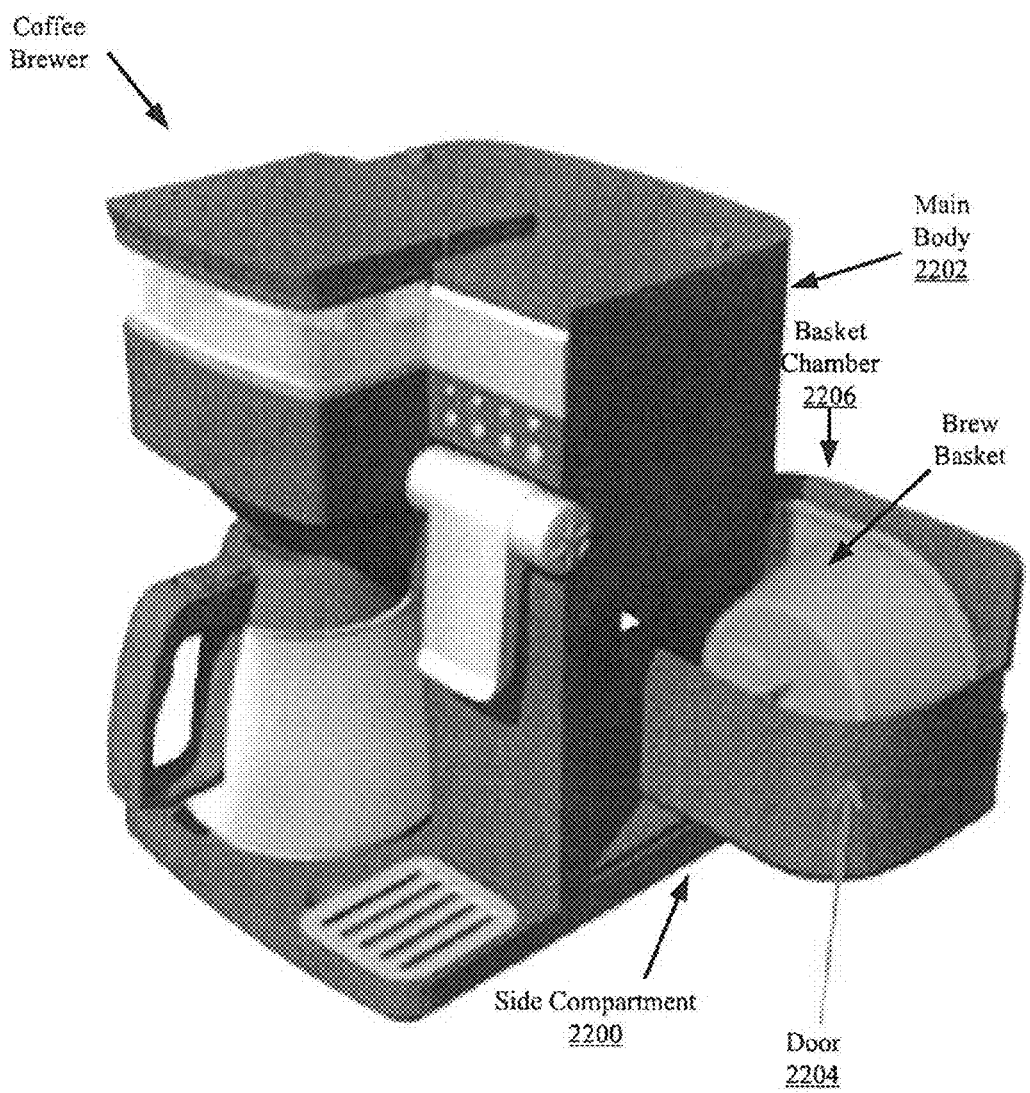
FIGS. 22, 23, 24, 25, 26, and 27 each provide a schematic illustration that is useful for understanding a respective filter basket arrangement of the hot beverage brewer shown in FIG. 1 for single serve container scenarios.
Figure 23:
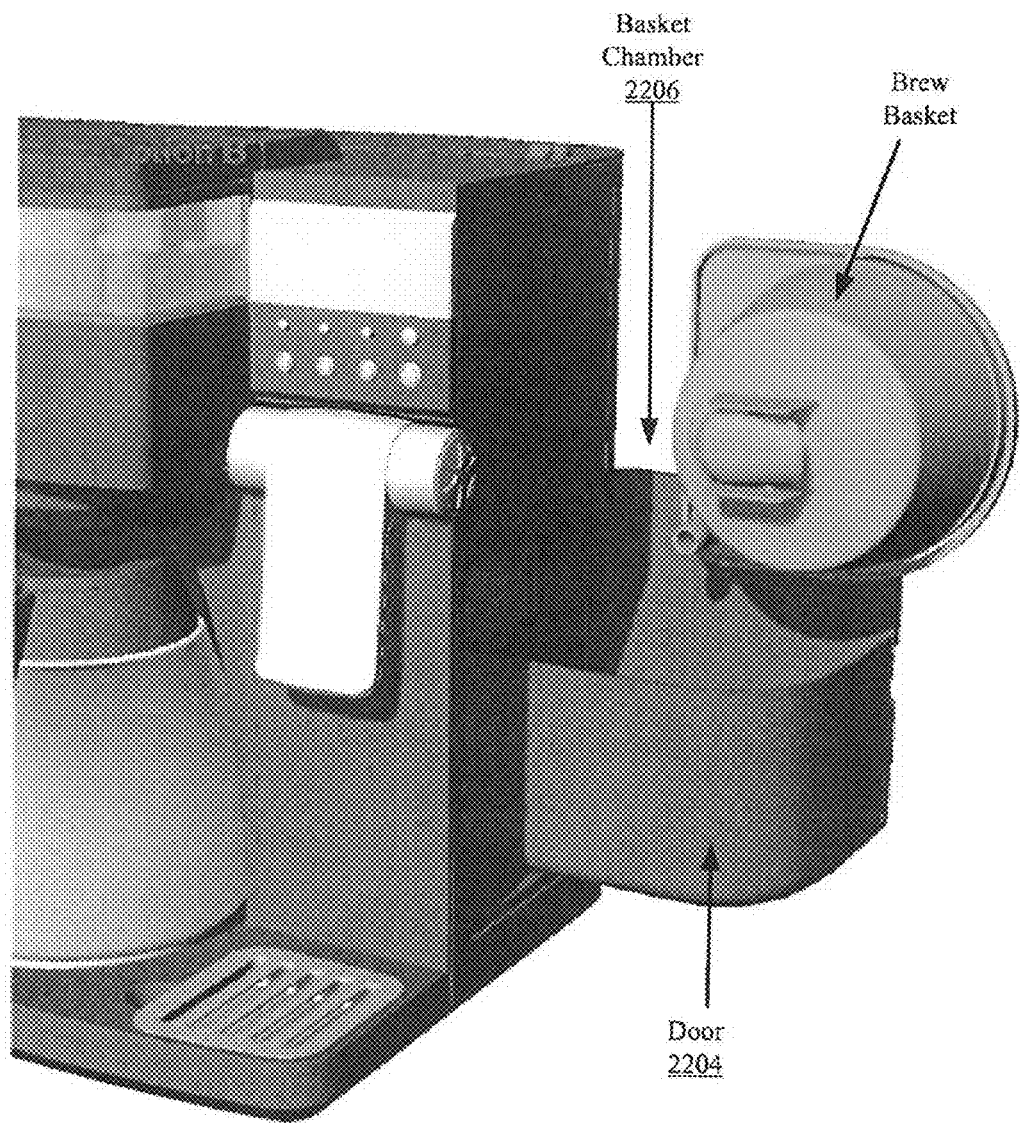
Figure 24:
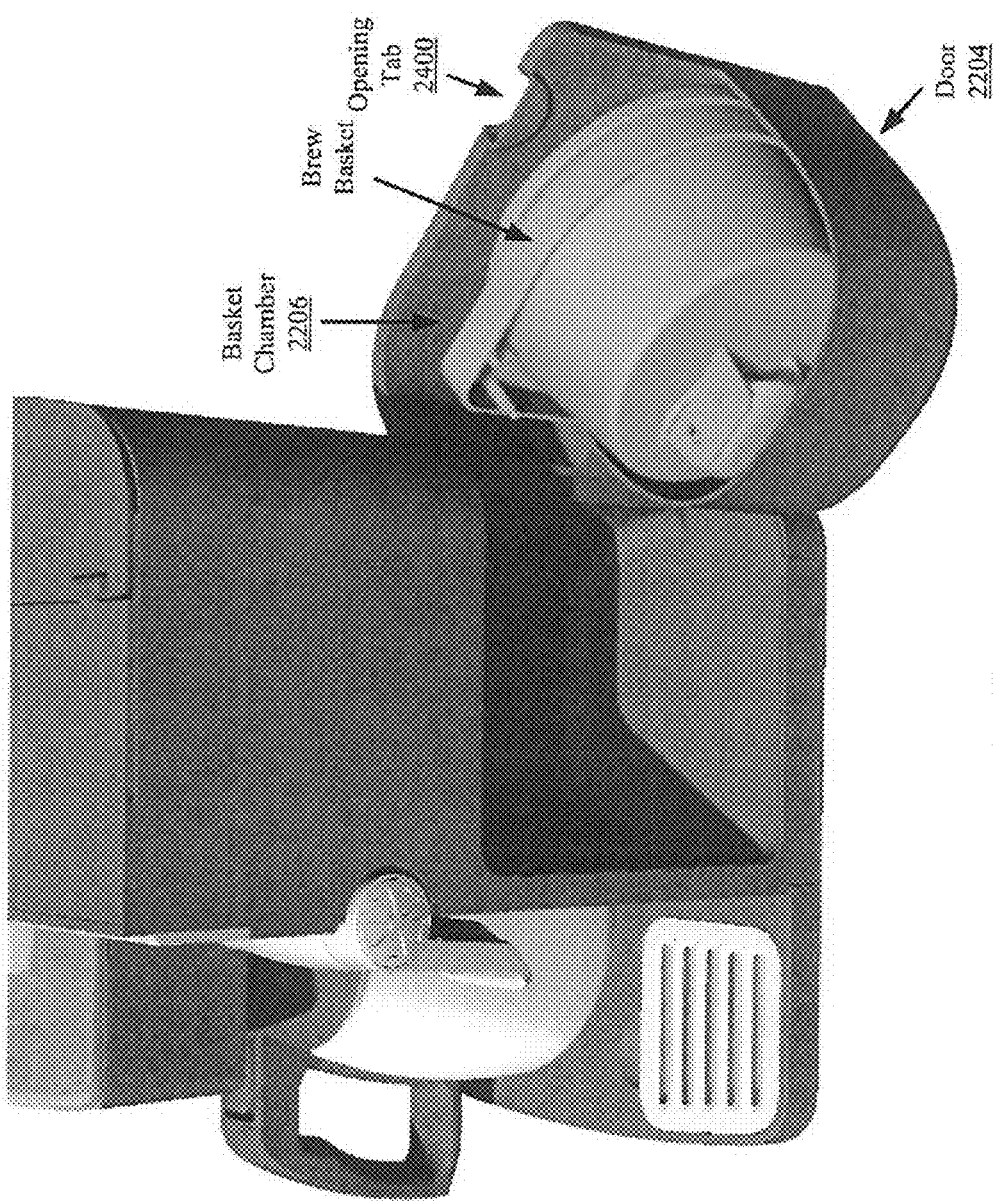
Figure 25:
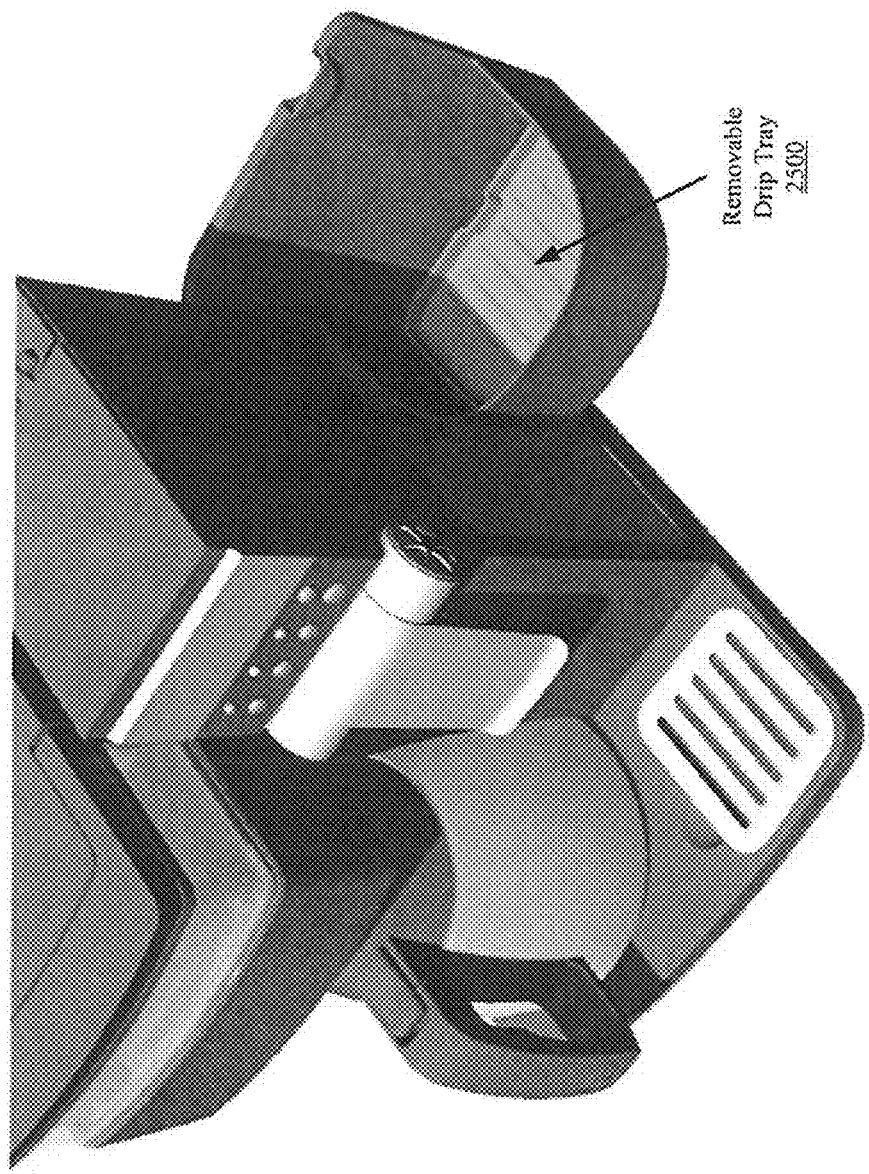
Figure 26:
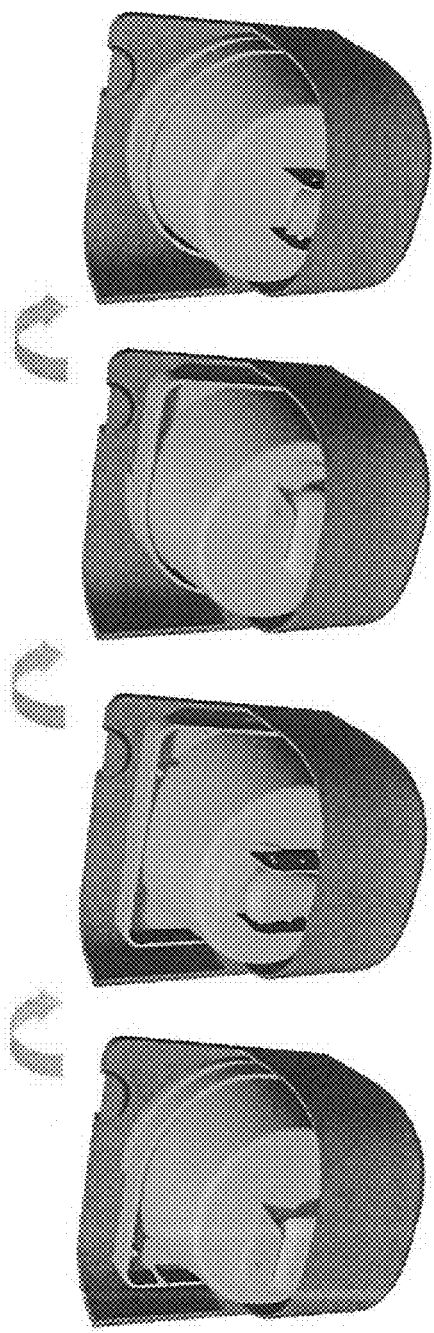
Figure 27:
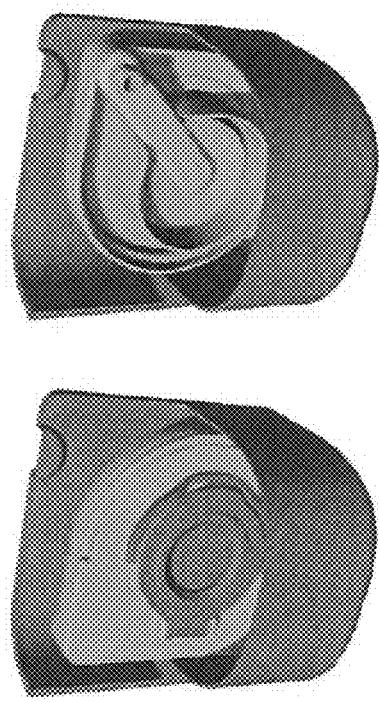

As noted above, a plurality of interchangeable brew baskets are provided with the hot beverage brewer 100. In this regard, the hot beverage brewer is provided with a side compartment 2200 as shown in FIGS. 22-23. The side compartment 2200 comprises a door 2204 hingedly attached to the main body 2202 of the hot beverage brewer which can be easily opened and closed by a user of the hot beverage brewer via opening tab 2400. The door hinge may reside along a top, side or bottom of the door 2204. The side compartment door 2204 may swing open from 0 degrees to N degrees, where N is an integer (e.g., 135). The value of N may be selected such that a brew basket can be easily inserted into and removed from a basket chamber 2206 coupled to the side compartment door 2204. The basket chamber 2206 is sized and shaped to receive each of the plurality of interchangeable brew baskets in one or more orientations (as shown in FIGS. 26-27). A removable drip tray 2500 may be provided for maintaining a clean basket chamber 2206.

The present invention is not limited to the side compartment 2200 architecture shown in FIGS. 22-23. In other scenarios, the side compartment comprises a removable tray instead of the basket chamber 2206 coupled to the side compartment door 2204. Access to the removable tray is provided via a door. The door may be as separate component from the tray or integrated with the tray.

Figure 28:
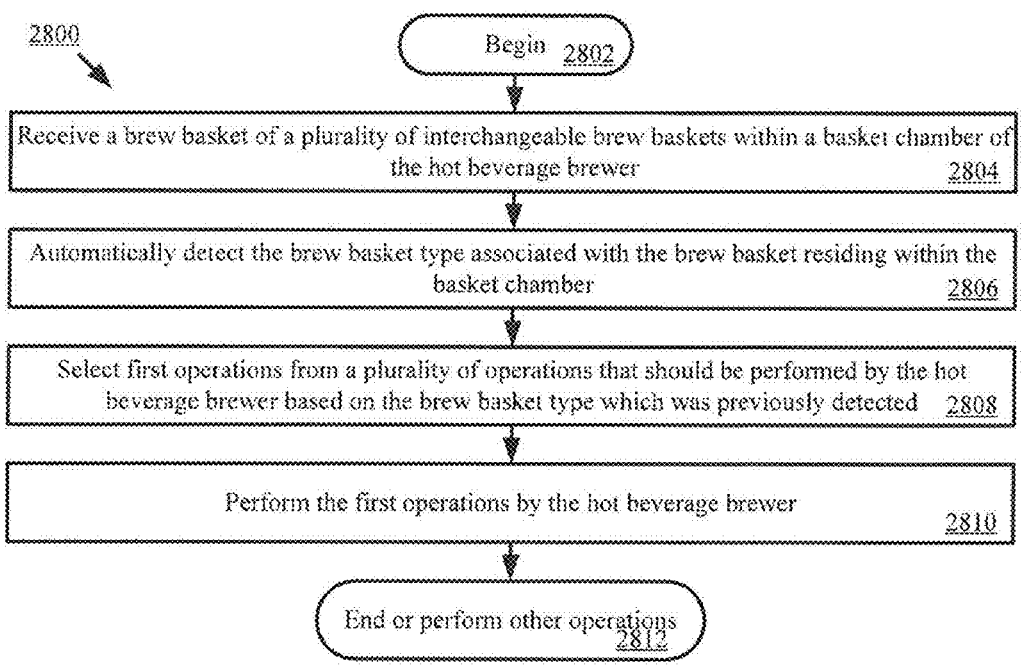
FIG. 28 is a flow diagram of an exemplary method for operating a hot beverage brewer.

Referring now to FIG. 28, there is provided a flow diagram of an exemplary method 2800 for operating a hot beverage brewer. Method 2800 begins with step 2802 and continues with step 2804. In step 2804, a brew basket of a plurality of interchangeable brew baskets brew baskets 900, 1400 and 1800) is received within a basket chamber of the hot beverage brewer. At least two of the plurality of interchangeable brew baskets are of different brew basket types and designed to hold different amounts of a crushed substance. Thereafter in steps 2806-2810, the hot beverage brewer: automatically detects the brew basket type associated with the brew basket residing within the basket chamber; selects first operations from a plurality of operations that should be performed by the hot beverage brewer based on the brew basket type which was previously detected; and performs the first operations. Upon completing step 2810, step 2812 is performed where method 2800 ends or other operations are performed.

In some scenarios, the different brew basket types comprise a large brew basket type for use with carafes and a small basket type for use with single serve containers. Each of the interchangeable brew baskets comprises at least one peg coupled thereto for triggering performance of respective operations of the plurality of operations by the hot beverage brewer. The automatic detection of the brew basket type is facilitated by engagement of a portion of the brew basket with a triggering mechanism of the hot beverage brewer. The triggering mechanism comprises a mechanical triggering mechanism, an optical triggering mechanism, an electrical triggering mechanism, or a magnetic triggering mechanism. Thus, the engagement may cause a depression of a button, an actuation of a switch, or creation of closed electrical circuit.

The first operations 2810 comprise at least one of the following operations: discontinuing a display of a visual indicator; selecting at least two visual indicator or virtual buttons from a plurality of visual indicators or virtual buttons; enabling functionality of selected virtual buttons; facilitating a display of selected visual indicators or virtual buttons on a display; setting a brew temperature; and setting a flow rate. The plurality of visual indicators or virtual buttons allow a user of the hot beverage brewer to specify a particular value for a volume parameter that is appropriate for the type of container in which the brewed hot beverage is to be disposed. The first operations can also optionally involve checking of there is enough water for that volume parameter selection before the beverage brewer performs a brewing process.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. An apparatus, comprising:
a hot beverage brewer with a single basket chamber having a first aperture to direct a fluid to a carafe and a second aperture to direct the fluid to a single serve container, where the first and second apertures are disposed at respective locations spatially offset from each other; and
a plurality of interchangeable brew baskets that are of different brew basket types and designed to hold different amounts of a beverage substance, were a first brew basket of the plurality of interchangeable brew baskets comprises a first outlet having a location that aligns with the first aperture when the first brew basket is disposed in said basket chamber, and a second brew basket of the plurality of interchangeable brew baskets comprises a second outlet having a location that aligns with the second aperture when the second brew basket is disposed in said same basket chamber.

2. The apparatus of claim 1, wherein the hot beverage brewer automatically detects a brew basket type associated with a brew basket residing within the basket chamber, selects first operations from a plurality of operations based on the brew basket type which was previously detected, and performs the first operations.

3. The apparatus according to claim 2, wherein the automatic detection of the brew basket type is facilitated by engagement of a portion of the brew basket with a triggering mechanism of the hot beverage brewer.

4. The apparatus according to claim 3, wherein the triggering mechanism includes a mechanical triggering mechanism, an optical triggering mechanism, an electrical triggering mechanism, or a magnetic triggering mechanism.

5. The apparatus according to claim 3, wherein the engagement causes a depression of a button, an actuation of a switch, or creation of closed electrical circuit.

6. The apparatus according to claim 2, wherein the first operations includes at least one of the following operations: discontinuing a display of a visual indicator; selecting at least two visual indicators or virtual buttons from a plurality of visual indicators or virtual buttons; enabling functionality of selected virtual buttons; facilitating a display of selected visual indicator or virtual buttons on a display; setting a brew temperature; and setting a flow rate.

7. The apparatus according to claim 6, wherein the plurality of visual indicators or virtual buttons allow a user of the hot beverage brewer to specify a particular value for a volume parameter that is appropriate for the type of container in which the brewed hot beverage is to be disposed.

8. The apparatus according to claim 1, wherein the different brew basket types includes a large brew basket type for use with carafes and a small basket type for use with single serve containers.

9. The apparatus according to claim 1, wherein each of the interchangeable brew baskets includes at least one peg coupled thereto for triggering performance of respective operations of the plurality of operations by the hot beverage brewer.

10. The apparatus according to claim 1, further including a spout for directing the fluid into a single serve container that is pivotably coupled to the hot beverage brewer.

11. A multi-mode hot beverage brewer, comprising:
a main body;
a single basket chamber having a first aperture to direct a fluid to a carafe and a second aperture to direct the fluid to a single serve container, where the first and second apertures are disposed at respective locations spatially offset from each other;
a spout pivotably coupled to the main body and provided for guiding the fluid from the basket chamber to the single serve container; and
a plurality of interchangeable brew baskets that each cause respective operations of the multi-mode hot beverage brewer to be triggered based on a type of brew basket disposed within the same basket chamber.

12. An apparatus, comprising:
a hot beverage brewer with a basket chamber having a first aperture to direct a fluid to a carafe and a second aperture to direct the fluid to a single serve container, where the first and second apertures are disposed at respective locations spatially offset from each other; and
a plurality of interchangeable brew baskets that are of different brew basket types and designed to hold different amounts of a beverage substance, where a first brew basket of the plurality of interchangeable brew baskets comprises a first outlet having a location that aligns with the first aperture when the first brew basket is disposed in said basket chamber, and a second brew basket of the plurality of interchangeable brew baskets comprises a second outlet having a location that aligns with the second aperture when the second brew basket is disposed in said basket chamber;
wherein each of the interchangeable brew baskets includes at least one peg coupled thereto for triggering performance of respective operations of the plurality of operations by the hot beverage brewer.

* * * * *